US006392791B1

(12) United States Patent
Fork et al.

(10) Patent No.: US 6,392,791 B1
(45) Date of Patent: May 21, 2002

(54) OPTICAL SYSTEM AND METHOD FOR PERFORMING A DEFINED FUNCTION ON AN OPTICAL BEAM HAVING AT LEAST ONE OF A MINIMIZED VOLUME OR REDUCED OPERATING TEMPERATURE

(75) Inventors: Richard Lynn Fork, Madison; Spencer Trent Cole, Danville, both of AL (US)

(73) Assignee: University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 09/696,717

(22) Filed: Oct. 25, 2000

Related U.S. Application Data

(60) Provisional application No. 60/161,410, filed on Oct. 25, 1999.

(51) Int. Cl.[7] .......................... H01S 3/034; H01S 3/086; H01S 3/081

(52) U.S. Cl. ....................... 359/347; 359/346; 372/99; 372/93

(58) Field of Search ............................. 359/333, 346; 372/9, 29.022, 31, 36, 66, 49, 67, 68, 70, 93, 92, 97, 99, 109

(56) References Cited

U.S. PATENT DOCUMENTS

| | | | | |
|---|---|---|---|---|
| 3,571,738 A | * | 3/1971 | Gloge | ........................ 330/4.3 |
| 4,221,468 A | * | 9/1980 | Macken | ...................... 350/292 |
| 5,020,895 A | | 6/1991 | Giesen et al. | |
| 5,131,002 A | * | 7/1992 | Mooradian | .................... 372/50 |
| 5,392,310 A | * | 2/1995 | Klein | ........................ 372/95 |
| 5,546,222 A | | 8/1996 | Plaessmann et al. | |
| 5,553,088 A | | 9/1996 | Brauch et al. | |
| 5,615,043 A | | 3/1997 | Plaessmann et al. | |
| 5,644,424 A | * | 7/1997 | Backus | ....................... 359/347 |
| 5,751,472 A | | 5/1998 | Jeys et al. | |
| 5,862,278 A | | 1/1999 | Brauch et al. | |
| 5,960,016 A | * | 9/1999 | Perry | .......................... 372/25 |

OTHER PUBLICATIONS

A. Giesen, H. Hugel, A. Voss, K. Wittig, U. Brauch and H. Opower, Scalable Concept for Diode–Pumped High–Power Solid–State Lasers, *Applied Physics*, 1994, pp. 365–372, vol. B 58.

(List continued on next page.)

*Primary Examiner*—Thomas H. Tarcza
*Assistant Examiner*—Andrew R Sommer
(74) *Attorney, Agent, or Firm*—Alston & Bird LLP

(57) ABSTRACT

The present invention provides optical systems and methods that use a plurality of optical reflectors to fold the optical path of an optical beam used in the optical system. By folding the optical path of the optical beam, the optical system and method of the present invention can in one instance minimize the over-all volume and mass of the optical system. Specifically, the present invention provides an optical amplifier that has a plurality of active and passive reflectors. The passive reflectors are oriented to fold the optical beam in a minimized volume and direct the optical beam repeatedly at the active reflectors to amplify the optical beam to a selected power level. The folding aspects of the optical reflectors may also decrease the operating temperature of the optical system. Specifically, the present invention also provides an optical system having active and passive reflectors where the active reflectors are spaced apart from each other such that the optical system may operate at decreased temperature. In this embodiment, the passive reflectors are oriented to direct the optical beam to the spaced-apart active reflectors. Further, the optical systems and methods of the present invention may also create a laser gyroscope having three optical beam paths for sensing rotation in three coordinate directions. This optical system has optical reflectors positioned to fold each of the optical beams into helical propagation paths. The optical paths are spaced closely together, such that the optical beams propagate within the defined volume of the optical system.

45 Claims, 17 Drawing Sheets

OTHER PUBLICATIONS

A. Voss, U. Brauch, K. Wittig and A. Giesen, Efficient High–Power Diode–Pumped Thin–Disk Yb: YAG–Laser, *SPIE*, 1995, pp. 501–508, vol. 2426.

U. Brauch, A. Giesen, M. Karszewski, Chr. Stewen and A Voss, Mulitwatt diode–pumped Yb: YAG thin disk laser continously tunable between 1018 and 1053 nm, *Optics Letters*, 1995, pp. 713–715.

Martin Karszewski, Uwe Branch, Karsten Contag, Adolf Giesen, Ingo Johannsen, Christian Stewen and Andreas Voss, Multiwatt Diode Pumped Thin Disc Yb:YAG Laser tunable between 1016 and 1062nm, Published in Proceedings of $2^{nd}$ International Conference on Tunable Solid State Lasers, Sep. 1–4, 1996, Wroclaw, Poland.

Karsten Contag, Uwe Brauch, Adolf Giesen, Ingo Johannsen, Martin Karszewski, Ulrich Schiegg, Christian Stewen and Andreas Voss, Multi–Hundred Watt Diode Pumped Yb:YAG Thin Disc Laser, *SPIE*, 1997, pp. 2–9, vol. 2986–01, published in Bellingham, WA.

S. Erhard, A. Giesen, M. Karszewski, T. Rupp, C. Stewen, I. Johannsen and K. Contag, Novel Pump Design of Yb:YAG Thin Disc Laser for Operation at Room Temperature with Improved Efficiency, *Trends In Optics And Photonics*, 1999, p. 38, vol. 26, published in Washington, DC.

A. Giesen, S. Erhard, M. Karszewski, T. Rupp, Ch. Schmitz, C. Stewen, H. Hugel, U. Brauch, I. Johannsen, H. Opower and K. Contag, The Thin Disk Laser with a New Pump Design—First Results, *Laser Opto*, 1999, p. 36, vol. 31, Issue 1.

A. Giesen, U. Brauch, M. Karszewski, Chr. Stewen and A. Voss, New Concepts for High Power Diode Pumped Solid State Lasers, *Topics In Applied Physics*, 2000, pp. 342–353, published in Heidelberg, Germany.

* cited by examiner

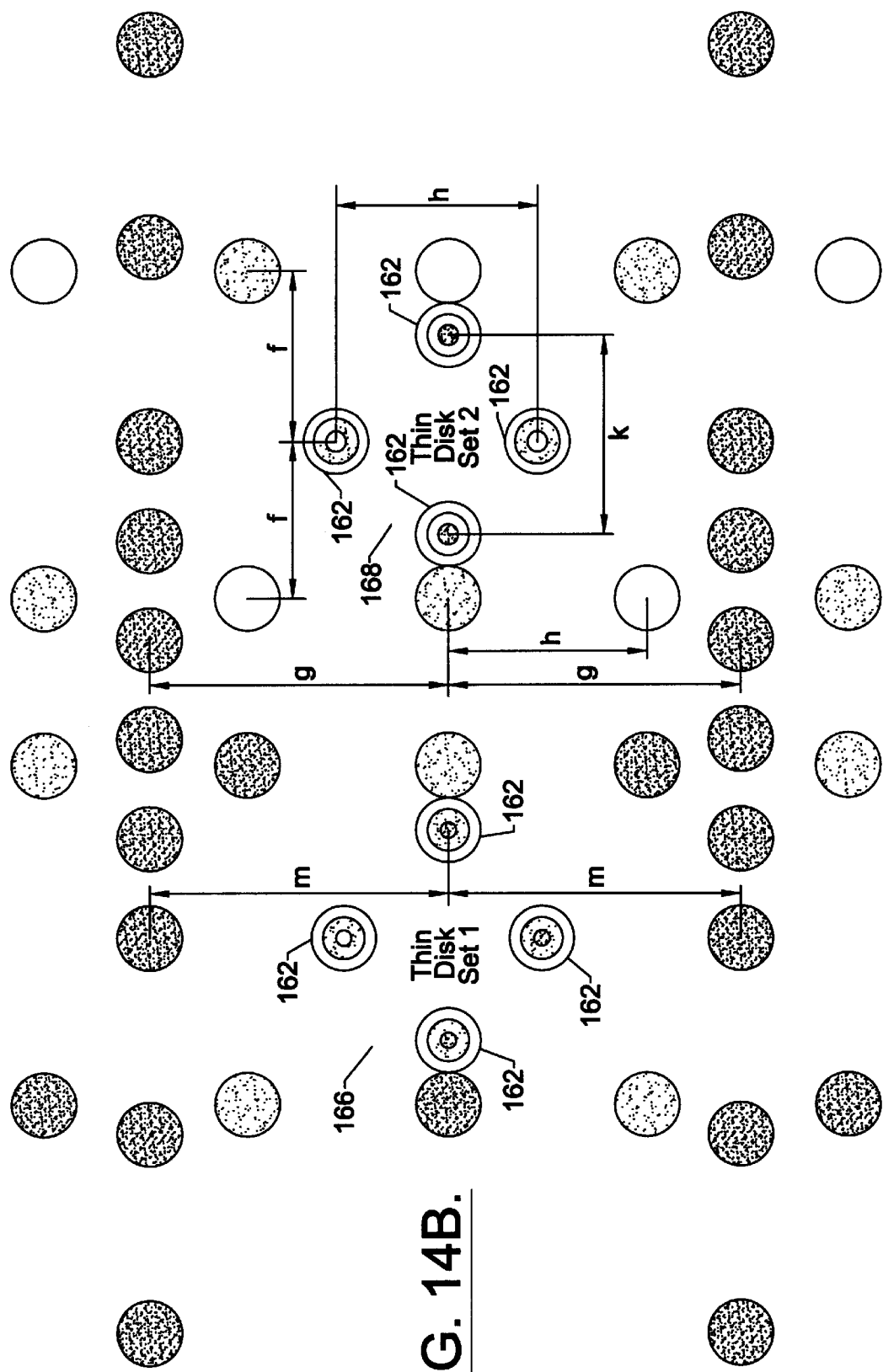

OPTICAL SYSTEM AND METHOD FOR PERFORMING A DEFINED FUNCTION ON AN OPTICAL BEAM HAVING AT LEAST ONE OF A MINIMIZED VOLUME OR REDUCED OPERATING TEMPERATURE

CROSS-REFERENCE TO RELATED APPLICATIONS

The present application claims priority from U.S. Provisional Application Ser. No. 60/161,410 entitled OPTICAL AMPLIFIER filed Oct. 25, 1999, the contents of which are incorporated herein by reference.

FIELD OF THE INVENTION

The present invention relates generally to optical systems for performing a defined function using an optical beam that propagates along an optical path within the optical system, and more particularly, to an optical system and method for folding the optical path of the optical beam into a defined volume of the optical amplifier such that the optical amplifier has at least one of a minimized volume and a reduced operating temperature.

BACKGROUND OF THE INVENTION

In the past few years, there has been an increased use of laser technology in many technical fields, including not only communications, but also in the manufacturing industry and the medical field. For example, the communications industry has replaced much of its existing electrical wiring with optic cable for the transmission of data and voice. Further, the welding and cutting industry has developed laser technology for cutting and welding, while the medical field has used laser technology to perform surgical procedures and other diagnostic testing. Given its versatility, laser technology is currently being considered for a broad range of uses. For example, laser technology has been discussed as a viable technology for transmitting high quantities of power from one location to another for use as a power source. This technology would not only be useful for remote geographic locations that do not have an existing power grid, but also for space-based applications.

One important aspect of many laser-based technologies is the ability to amplify the optical beam of the laser to a desired power level. For this purpose, optical amplifiers have been developed which amplify an optical beam by impinging the beam on a laser-active material. A second optical beam, referred to as an optical pump beam, energizes the laser-active material and increases the power level of the laser-active material. This power is transferred to the optical beam being amplified as it passes through the laser-active material.

Although conventional optical amplifiers are typically suitable for many laser applications, there are some drawbacks associated with these conventional systems. Specifically, many high gain optical amplifiers are typically designed to have an elongated rod-like geometry. The gain path for an optical beam incident on the optical amplifier is composed of short gain regions followed by long regions having no gain. For applications requiring large laser gains, these conventional rod-shaped amplifiers may become extremely elongated and significantly increase the volume and mass of the laser application. For example, welding and cutting systems that require a relatively large amount of laser power may require an optical amplifier that far exceeds design and size limitations for the welder or cutter. More importantly, in spaced-based applications, where volume and mass are at a premium, the incorporation of a large-scale optical amplifier may not be possible.

In light of this, optical amplifiers have been developed which attempt to minimize the volume and mass of the optical amplifier. One such class of optical amplifiers is typically referred to as a multi-pass optical amplifier. A multi-pass optical amplifier typically controls the path of the optical beam to be amplified such that the optical beam is passed several times through a laser-active material. With each pass, the optical beam is amplified. By using the same laser-active material and directing the optical beam on the same laser-active material, the size of the optical amplifier may be reduced.

For example, U.S. Pat. Nos. 5,546,222 and 5,615,043 both to Plaessmann et al. provide one illustration of a multi-pass laser. Specifically, with reference to FIG. 1, the multi-pass laser 40 disclosed in these patents defines a laser-active material 42 located between two reflectors 44 and 46. A pump beam source 48 is located in close proximity to the multi-pass laser and directs a pump beam 50 via lenses 52 and 54 at the laser-active material. The multi-pass laser further includes an outlet 56 from which the optical beam that is amplified escapes. Further, the multi-pass amplifier of this reference includes a transparent material 58 to direct the optical beam to the reflector 46. In this multi-pass laser system, an optical beam 60 to be amplified enters the optical amplifier and is directed on the laser-active material, where it is amplified. The amplified beam is then reflected back and forth between the reflectors 44 and 46 through the laser-active material until the optical beam exits the optical amplifier. Although this optical amplifier does provide a method for amplifying an optical signal, it does have some limitations.

Specifically, the temperature of laser-active material must be properly regulated to ensure the desired amplification and optical beam quality. Allowing the laser-active material to overheat may not only affect the amplified optical beam, but may also subject the laser-active material to undue stress. For this reason, with reference to FIG. 1A, the conventional multi-pass optical amplifier connects the laser-active material 42 to a thermally conductive housing 61. While this configuration aids in the reduction of heat in the laser-active material, it does have drawbacks.

For example, the heat sink configuration of the conventional multi-pass amplifier illustrated in FIG. 1A removes heat from a direction perpendicular to the path that the optical signal follows through the laser-active material. This, in turn, creates thermal induced gradients perpendicular to the path of the optical beam that may cause distortions in the refractive index of the laser-active material. In this conventional multi-pass optical amplifier, however, the heat sink cannot be placed such that it removes heat in a direction parallel to the path of the optical beam, as it would obstruct the optical beam.

FIG. 2 illustrates a second type of multi-pass optical amplifier disclosed in U.S. Pat. No. 5,553,088 to Brauch et al. This multi-pass optical amplifier 62 includes three active reflectors 64a–c each connected to a separate substrate 66a–c and having individual pump sources 68a–c directed at each active reflector. These active reflectors each include a laser-active layer 70 and a reflective layer 72. To amplify an optical beam, the optical beam is directed at the first active reflector 64a, where it is amplified and reflected to the second active reflector 64b. This is continued for the second and third active reflectors. Advantageously, the substrates 66a–c to which the active reflectors are connected are heat sinks, which remove heat from the active reflectors in a direction essentially parallel to the path of the optical signal impinging on the active reflectors. As such, thermally induced gradients in the index of refraction are reduced.

Although the conventional multi-pass optical amplifier disclosed in the Brauch patent does alleviate some of the problems associated with heat removal, it also has some drawbacks. Specifically, as discussed, it is advantageous to minimize the volume and mass of the optical amplifier. However, the multi-pass optical amplifier illustrated in FIG. 2 only impinges the optical beam once on each active reflector and uses a separate pump beam for each active reflector. The multi-pass optical amplifier of FIG. 2 would require several active reflectors and associated pump beam devices to generate an optical beam with high gain, thereby requiring a multi-pass optical amplifier of an undesirable scale.

With reference to FIG. 3, the Brauch '088 patent further discloses a device for repeatedly supplying a pump beam to an active reflector. Specifically, this device 74 includes an active reflector 76, a pump beam source 78, and a plurality of reflectors 80–88. Further, the device includes two coupling devices 90 and 92 for directing the optical beam 94 to be amplified to the active reflector 76. The pump beam systematically reflects between the reflectors and the active reflector such that the pump beam impinges on the active reflector eight times.

Although this device illustrates repeatedly providing a pump beam to an active reflector, it does not provide disclosure as to how the device can be used to energize an optical beam by repeatedly providing it to the active reflector, such that both the optical beam and pump beam are repeatedly impinged on the active reflector. Further, the device uses an added reflector 88 located beside the active reflector to properly align the pump beam. This added reflector may not only add additional size to the optical amplifier, it may also reduce the power of the pump beam as it propagates to and from the extra reflector 88 and impinges on the reflector. Further, and importantly, the Brauch '088 patent does not disclose how the pump and optical beams may be redirected to another active reflector such that the optical beam may be further amplified and the pump beam used to energize another active reflector.

As discussed above, the laser-active material of optical amplifiers produces a relatively large amount of heat that affects the operation of the optical system. In light of this, it is typically advantageous to allow for reduced operational heat. However, in many conventional optical systems, the laser-active elements may be spaced too closely to one another an may overheat.

Further, there are other optical system applications that currently use elongated optical paths. These systems may be large in volume and mass and not easily implemented. Further, because they use these elongated optical paths, there is not an opportunity to effectively control the optical beam in the optical system.

SUMMARY OF THE INVENTION

As set forth below, the present invention provides optical systems and methods that use a plurality of optical reflectors to fold the optical path of an optical beam used in the optical system. By folding the optical path of the optical beam, the optical system and method of the present invention can in one instance minimize the over-all volume and mass of the optical system. Further, using the folding aspects of the optical reflectors, the optical system and method of the present invention may also reduce the operating heat of the optical system. Specifically, the active reflectors of the optical system that generate heat may be spaced farther apart such that the heat from one active reflector does not add to the heating of the another active reflector to thereby reduce the operating temperature of the active reflectors. The passive reflectors used to fold the optical beam may be orientated such that the optical beam is directed to the spatially separated active reflectors. It should be noted that one or more or all of the said passive reflectors could be active.

Further, the optical system and method of the present invention may also be used to create a laser gyroscope having three optical beam paths for sensing rotation in three coordinate directions. In this embodiment, the optical system and method of the present invention positions the optical reflectors within the optical system such that the optical reflectors fold each of the optical beams into helical propagation paths. The optical paths are spaced closely together, such that the optical beams propagate within the defined volume of the optical system in a minimized volume.

The present invention also includes a method for designing an optical system to perform a desired function using an optical beam that propagates along an optical path within the optical system. The method designs the optical system such that is has at least one of a minimized size and a reduced operating temperature. The method includes the step of first determining the desired optical path of the optical beam as it propagates through the optical system to perform the desired function. Next the method determines the desired characteristic of the optical beam and the desired number of active reflectors needed to create the desired characteristics of the optical beam. Using this information, the method determines the number and position within the optical system of passive reflectors required to systematically fold the optical beam into a structured optical path within a defined volume of the optical system such that the optical beam performs the desired function of the optical system. The method of the present invention also at least minimizes the volume of the optical system or reduces the operating temperature of the active reflectors.

As an example, in one embodiment, the present invention provides a multi-pass optical amplifier and method that overcomes many of the deficiencies identified with amplifying an optical beam. In particular, the optical amplifier of the present invention is a multi-pass optical system having active reflectors that are connected to two facing construction surfaces. Located on each construction surface is a plurality of passive reflectors that fold the optical path of the optical beam into a smaller volume. The passive reflectors redirect the optical beam such that it is repeatedly directed at the active reflectors. The optical amplifier of the present invention also includes pump beam reflectors for directing an optical pump beam at the active reflectors.

In operation, the pump beam reflectors systematically direct a pump beam at the active reflectors several times to thereby energize the active reflectors. Further, the passive reflectors systematically direct an optical beam in a stepwise fashion between each of the passive reflectors and the active reflectors such that the optical beam is directed on the active reflectors several times to thereby provide an optical beam that has been amplified to a selected power level.

Importantly, the passive reflectors fold the path of the optical beam into a minimum volume, thereby minimizing the overall volume and mass of the optical amplifier. Further, the passive reflectors direct the optical beam to more than one active reflector, such that the optical beam can be further amplified. Additionally, the passive reflectors are orientated on the construction surfaces in such a manner that the passive reflectors efficiently reflect the optical beam between the passive reflectors and the active reflectors without requiring added passive reflectors and optical paths that may decrease the power level of the signal and require more space.

Additionally, in one embodiment, the active reflector comprises a laser-active layer and reflective layer connected to the construction surfaces. In this embodiment, the construction surfaces operate as heat sinks, which remove thermal heat from the active reflectors in a direction essentially parallel to the direction in which the optical beam impinges the active reflector. This, in turn, reduces distortion of the refractive index in the active reflector. Specifically, because it removes heat in a direction essentially parallel to the direction of the optical beam, the optical amplifier of the present invention does not introduce distortion in the direction perpendicular to the direction of propagation of the optical beam.

Because the optical amplifier of the present invention uses a plurality of passive reflectors to fold the optical beam into a reduced volume, the individual passive reflectors provide a way to maintain or adjust the optical beam quality. Specifically, the passive reflectors may be used to address beam divergence concerns. Further, the passive reflectors can be use to expand the beam to reduce high intensity in the optical beam. The passive reflectors could also be used to increase the diameter of the beam and thus reduce the intensity (power per unit area) of the beam. The passive reflectors could also be configured such that the active reflectors could be spaced further apart, such that the heat from one active reflector does not affect the other active reflectors. Additionally, the passive reflectors may be used to control at least one of a temporal distribution, spatial distribution, and phase properties of the incident beam.

These and other advantages are recognized by an optical amplifier according to one embodiment of the present invention for amplifying an optical beam to a selected power level while minimizing the volume and mass of the optical amplifier. The optical amplifier of this embodiment includes first and second construction surfaces oriented in facing relationship to each other. Located on each of the construction surfaces is at least one active reflector for amplifying an optical beam incident on the active reflectors and reflecting the amplified incident beam. Importantly, the optical amplifier further includes at least one passive reflector located on each of the first and second construction surfaces.

In operation, the passive reflectors fold the optical path of the optical beam and sequentially direct the incident optical beam on the active reflectors located on the construction surfaces. The incident optical beam is thus amplified to a selected power level as the incident beam is repeatedly reflected between the active reflectors. In addition to amplifying the optical beam to a selected power level, by folding the path of the incident beam into a minimum volume, the overall volume and mass of the optical amplifier is minimized.

In one embodiment of the present invention, the optical amplifier further includes at least one pump beam reflector located on each of the first and second construction surfaces. The pump beam reflectors direct an optical pump beam such that it is incident on the active reflector to thereby increase the power level of the active reflectors. In a further embodiment, the optical amplifier of the present invention includes a plurality of pump beam reflectors located on each of the first and second construction surfaces and positioned to direct an optical pump beam incident to the active reflector located on the opposed construction surface. In this embodiment, the optical amplifier further includes a pump beam reflector located on the first construction surface that is positioned such that the pump beam reflector directs the optical pump beam from the first construction surface to the second construction surface. This embodiment may also include a recursive pump beam reflector located on the second construction surface.

In this embodiment of the present invention, the optical pump beam is first reflected between all of the pump reflectors on the first construction surface and the active reflectors on the second construction surface. After which, a pump beam reflector on the first construction surface directs the optical pump beam to the pump beam reflectors on the second construction surface, where it used by the pump beam reflectors on the second construction surface to energize the active reflector on the first construction surface. After the optical pump beam has been systematically reflected between all of the pump beam reflectors and active reflector on the first construction surface, the recursive pump beam reflector redirects the optical pump beam such that the optical pump beam is systematically reflected between all of the pump beam reflectors and active reflectors in a reverse propagation path. In a further embodiment, the pump beam reflectors on the first construction surface may also include a recursive pump beam reflector that again redirects the optical pump beam signal to again follow the optical path between the pump beam reflectors and the active reflectors in a forward path.

As discussed above, the optical amplifier includes active reflectors for amplifying the optical signal. In one embodiment, the active reflector is a thin film disk having a plane for receiving the incident optical beam and a layer of laser-active material proximate to a reflective layer. In this embodiment of the present invention, the laser-active layer increases the power level of the incident beam to a first power level when the active reflector initially receives the incident beam. Further, the laser-active layer increases the power level of the incident optical beam to a second power level after the reflective layer reflects the incident beam.

In a further embodiment, the active reflector further includes a heat sink proximate to the reflective layer. The heat sink removes heat from the active reflector in a direction essentially parallel to the direction with which the incident optical beam enters the active reflector to thereby minimize distortions in the incident optical beam due to a thermally induced gradient.

As detailed above, the optical amplifier of the present invention provides a structure such that an optical signal may be amplified to a selected power level while also minimizing the volume and mass of the optical amplifier. In light of this, in one embodiment, the first and second construction surfaces approximate symmetrical confocal surfaces. In this embodiment, the optical amplifier includes two active reflectors located on each of the first and second construction surfaces and positioned such that planes of the active reflectors on which the optical beam impinges is normal to a line drawn between the axes of the construction surfaces. The optical amplifier of this embodiment further includes a first set of passive reflectors located on the first construction surface for directing the incident optical beam to the active reflectors located on the second construction surface and a second set of passive reflectors located on the second construction surface for directing an incident beam to the active reflectors located on the first construction surface.

In this embodiment, each of the passive reflectors is located on the construction surfaces such that the planes of the passive reflectors on which the optical beam are directed are parallel to a line tangent to the symmetrical confocal surface of the construction surfaces. Further, the first group of passive reflectors includes at least one passive reflector located on the first construction surface and positioned such that the passive reflector directs the incident beam toward the second group of passive reflectors, after the incident beam has been reflected between all of the first group of passive reflectors and the corresponding active reflector on the second construction surface. The optical pump beam then propagates between the pump beam reflectors on the second construction surface and the active reflectors on the first construction surface. The optical pump beams on the second construction surface may include a recursive reflector that redirects the optical pump beam in a reverse path such that optical pump beam is redirected to optical pump beam reflectors and the active reflectors. In a further embodiment, the pump beam reflectors on the first construction surface may also include a recursive pump beam reflector that again redirects the optical pump beam signal to again follow the optical path between the pump beam reflectors and the active reflectors in a forward path.

To alleviate problems with laser action between the active reflectors on the construction surfaces, the active reflectors for the second construction surface may be offset 90° with respect to the axis of the active reflectors of the second construction surface to thereby minimize laser action between the active reflectors.

In addition, because the optical amplifier of the present invention uses a plurality of passive reflectors to fold the optical beam into a reduced volume, the individual passive reflectors provide a way to maintain or adjust the optical beam quality. Specifically, the passive reflectors may be used to address beam divergence concerns. Further, the passive reflectors can be use to expand the beam to reduce high intensity in the optical beam. The passive reflectors could also be used to increase the diameter of the beam and thus reduce the intensity (power per unit area) of the beam. The passive reflectors could also be configured such that the active reflectors could be spaced further apart such that the heat from one active reflector does not add to the heating of another active reflector to thereby reduce the operating temperature of the active reflectors. Additionally, the passive reflectors may be used to control at least one of a temporal distribution, spatial distribution, and phase properties of the incident beam.

The use of the multiple passive reflectors also provides advantages over an optical amplifier that merely uses a spherical surface to direct the optical beams. Specifically, a spherical surface will typically direct the optical beam through the sequence until it gets to the last reflector that has to redirect the beam. However, the spherical surface may not be optimal. The passive reflectors of the present invention, on the other hand, provide a desired optical beam path and provide a desired optical beam diameter. This, in turn, addresses problems with divergence. Specifically, the passive reflectors may designed such that they may control the optical beam to maintain beam quality.

In addition, the present invention also provides an optical system that is a laser gyroscope having three optical beam paths for sensing rotation in three coordinate directions. In this embodiment of the present invention, a plurality of optical reflectors are positioned within the optical system such that the optical reflectors fold each of the optical beams into helical propagation paths. As such, the optical beams propagate within the defined volume of the optical system in a minimized volume.

Further, the present invention also provides an optical system that reduces the operating temperature of the active reflectors. In this embodiment, the optical system includes both passive reflectors for folding the optical beam and active reflectors for amplifying and folding the optical beam. The active reflectors of this embodiment produce heat that may alter the characteristics of the optical system. The active reflectors are spaced a desired distance apart such that the heat from one active reflector does not add to the heating of the another active reflector to thereby reduce the operating temperature of the active reflectors. The passive reflectors are positioned within the optical system such that the optical beam is directed between the passive and active reflectors in a desired optical path to perform the defined function of the optical system.

BRIEF DESCRIPTION OF THE DRAWINGS

Figure 1:
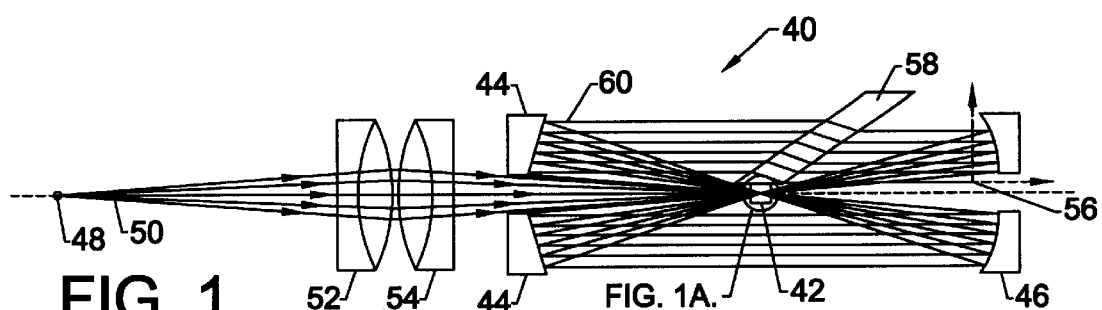
Figure 1A:
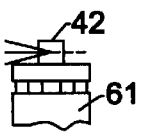

Having thus described the invention in general terms, reference will now be made to the accompanying drawings, which are not necessarily drawn to scale, and wherein:

FIGS. 1 and 1A are cross-sectional views of a conventional multi-pass optical amplifier having a laser-active material located at the focus of two reflectors for amplifying an optical beam.

Figure 2:
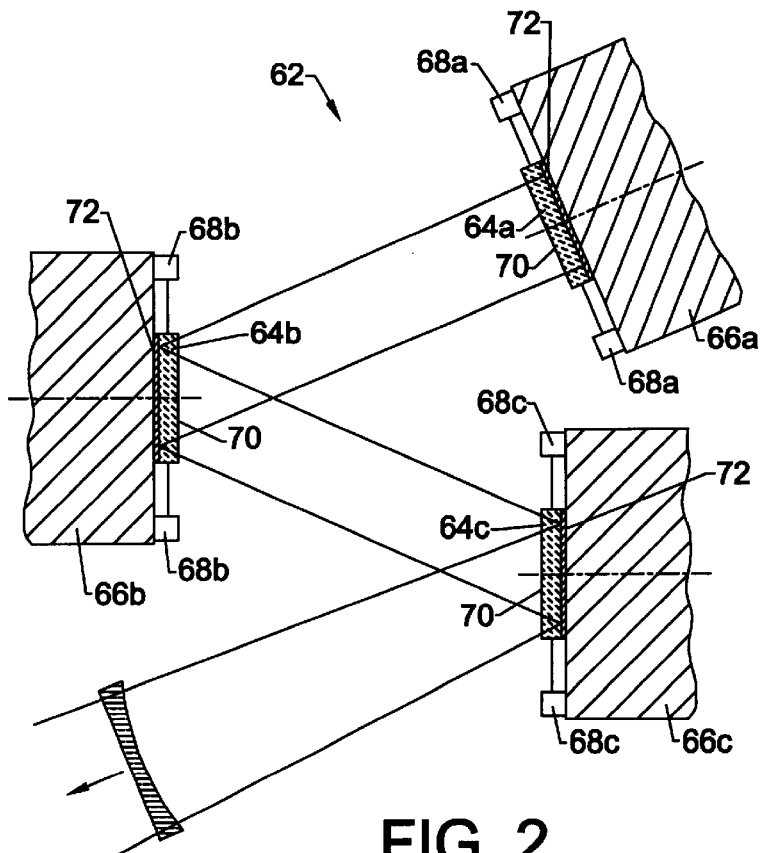

FIG. 2 is a cross-sectional view of a multi-pass system for directing a optical pump beam at a number of thin film amplifiers having laser-active elements to thereby energize the thin film amplifiers.

Figure 3:
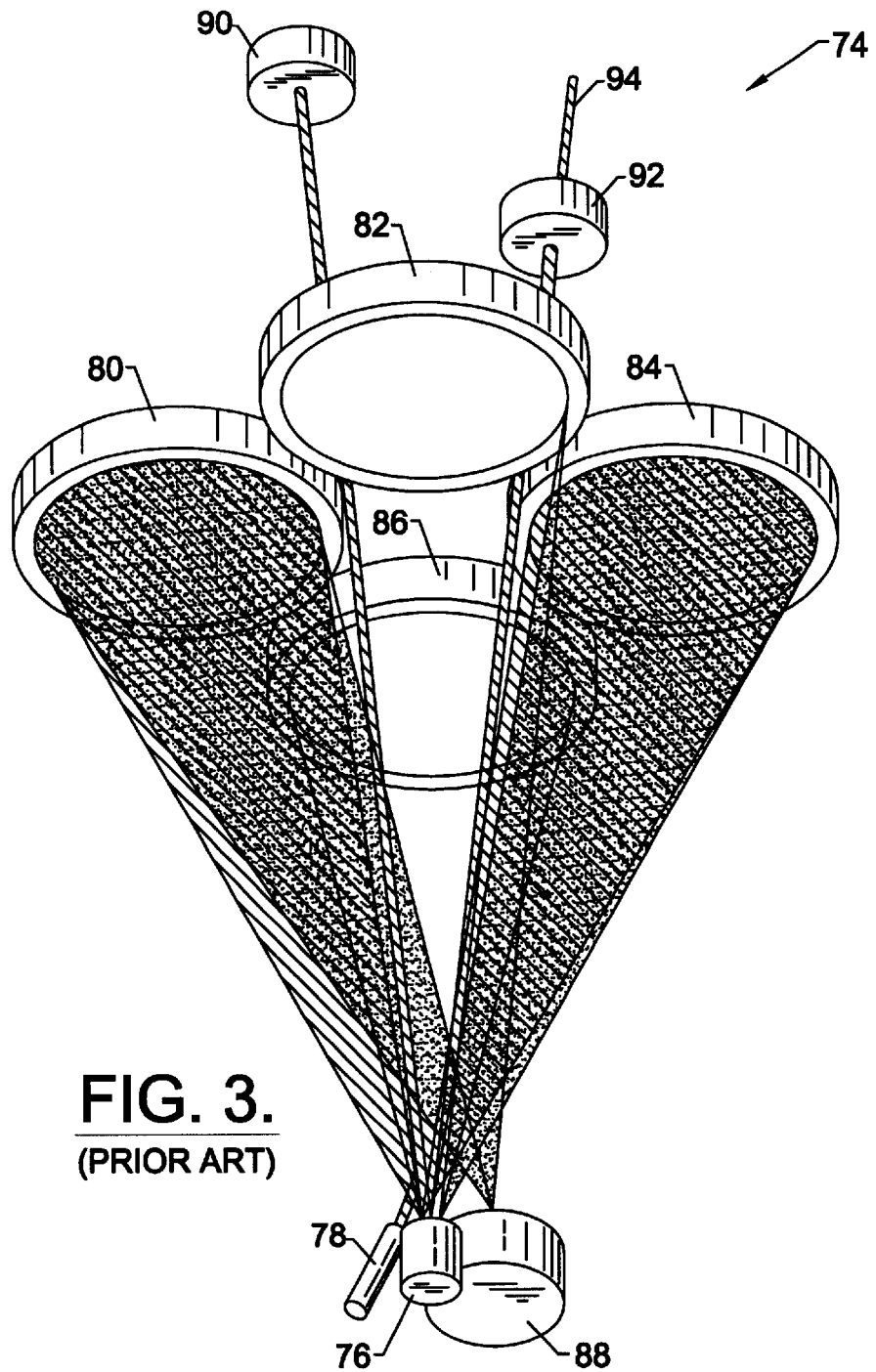

FIG. 3 is a plan view of a conventional multi-pass optical amplifier having a laser-active material located at the focus of a series reflectors for amplifying an optical beam.

Figure 4:
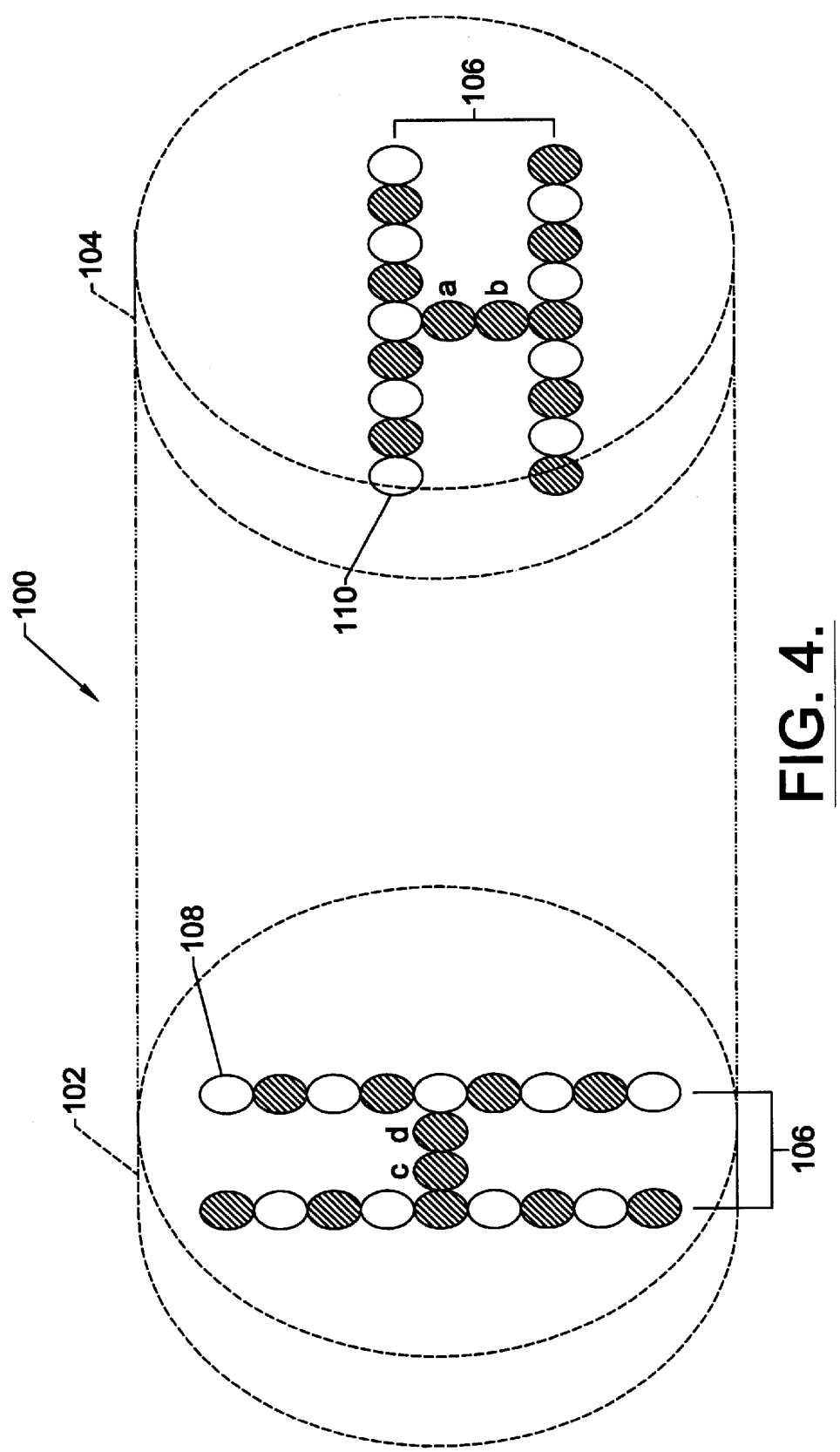

FIG. 4 is a side view of a general optical amplifier for amplifying an optical signal to a selected power level while minimizing the volume and mass of the optical amplifier by folding the path length of the optical beam according to one embodiment of the present invention.

Figure 5:
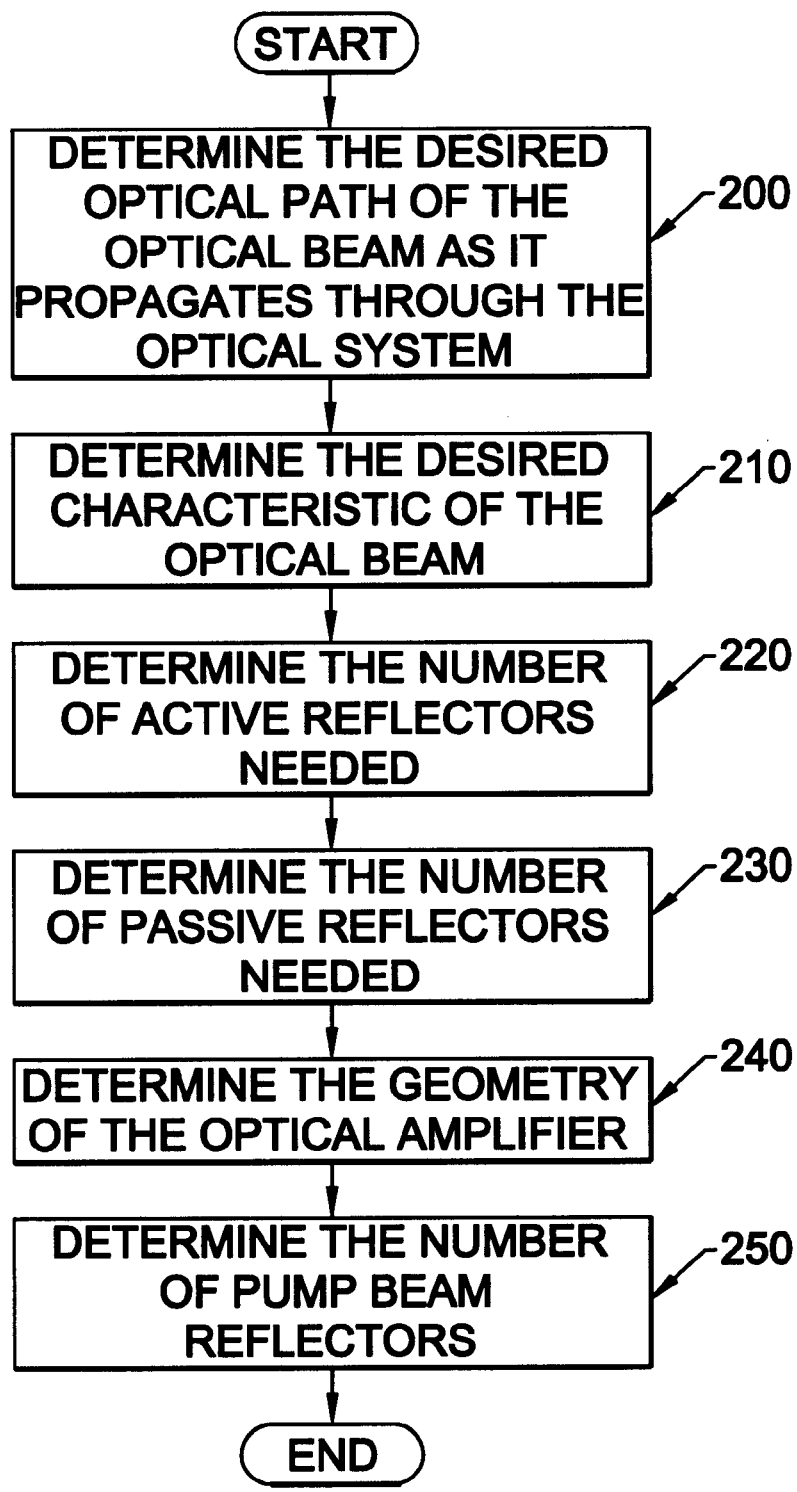

FIG. 5 is a block diagram of the operations performed to design an optical amplifier having a required number of passive and active reflectors to amplify an optical signal by a selected power level according to one embodiment of the present invention.

Figure 6:
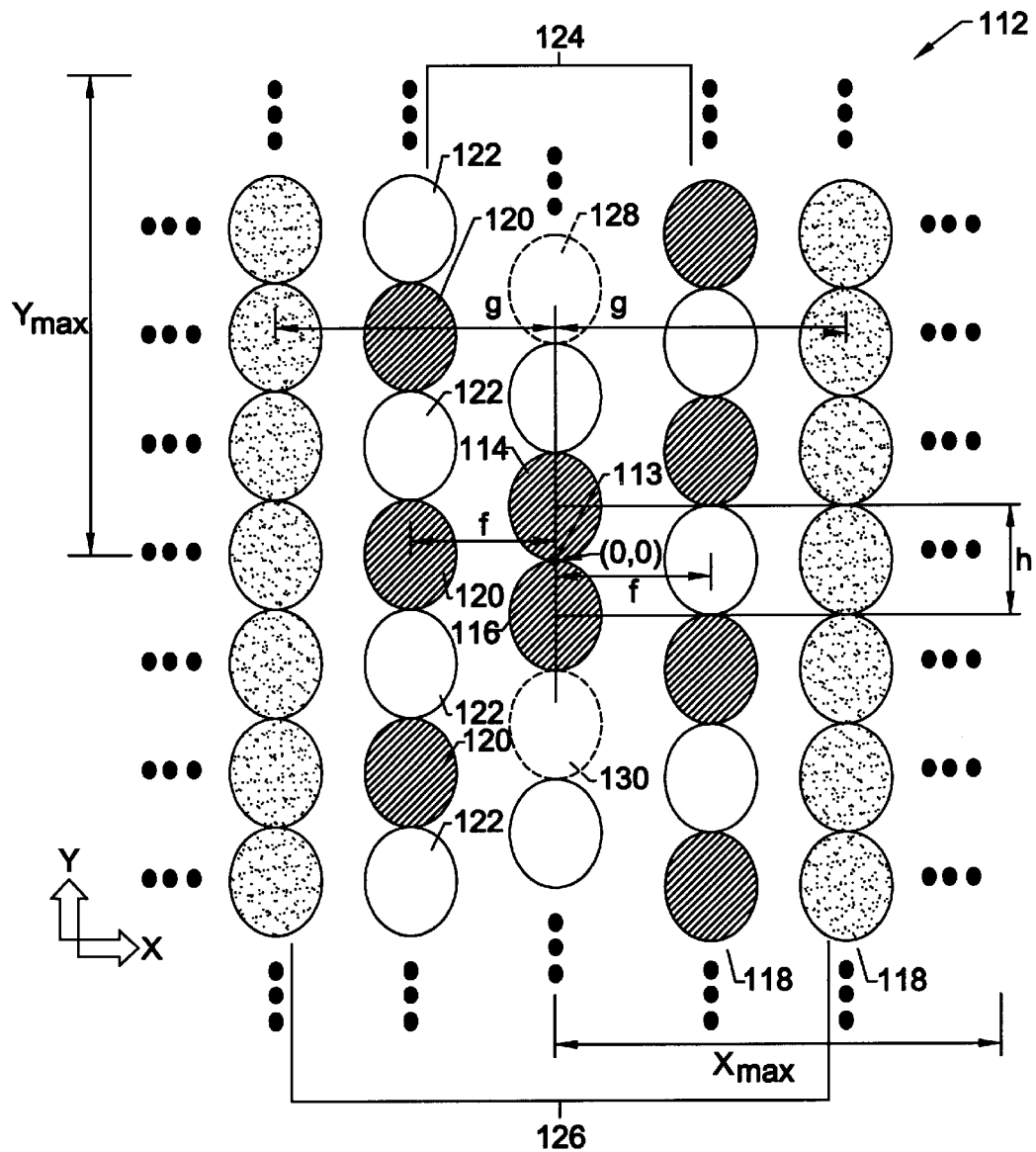

FIG. 6 is a front view of one construction surface of an amplifier according to one embodiment of the present invention illustrating the placement of passive and active reflectors.

Figure 7:
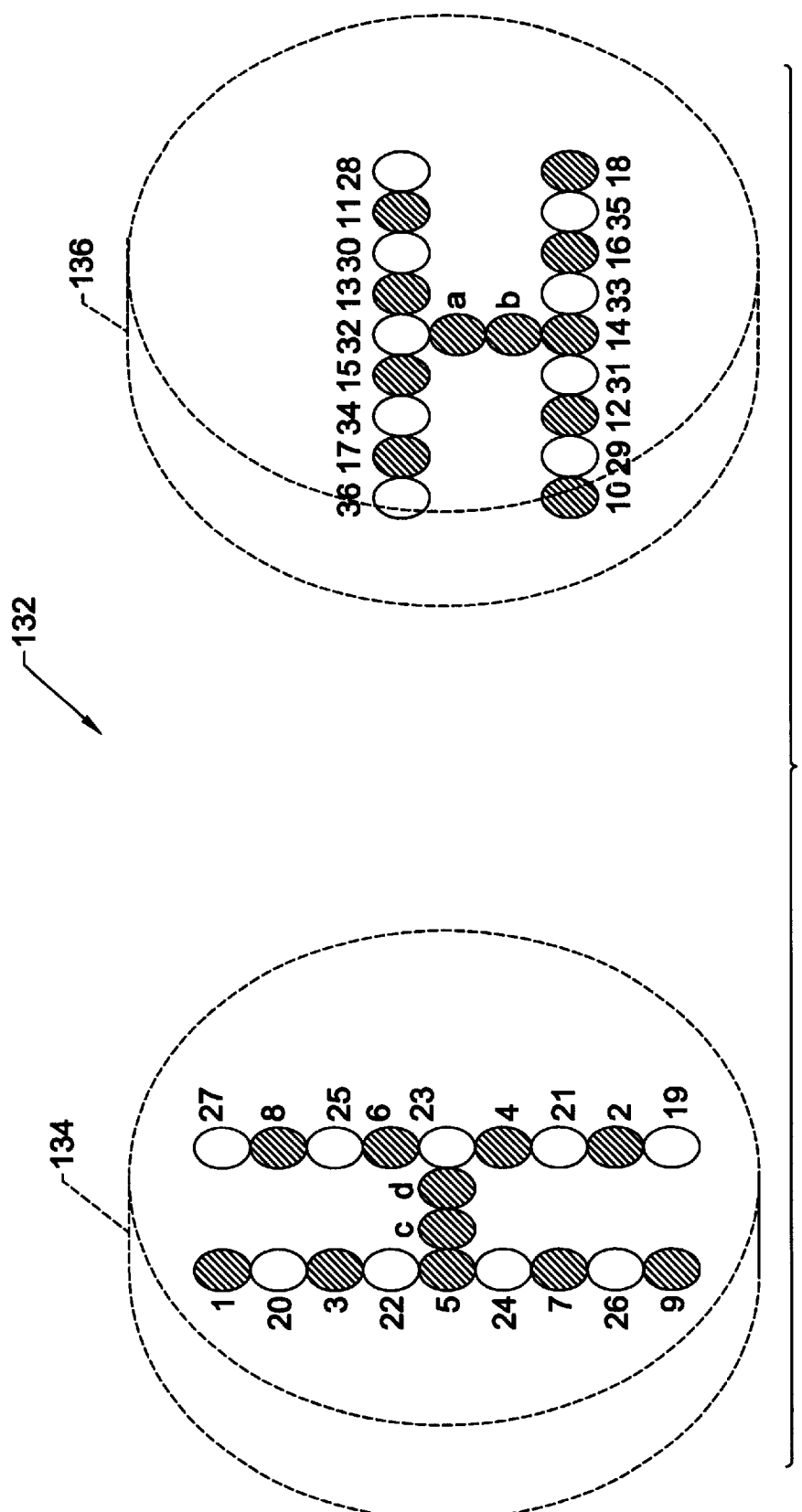

FIG. 7 is an oblique view of an optical amplifier for amplifying an optical signal to a selected power level while minimizing the volume and mass of the optical amplifier by folding the path length of the optical beam according to one embodiment of the present invention.

Figure 8B:
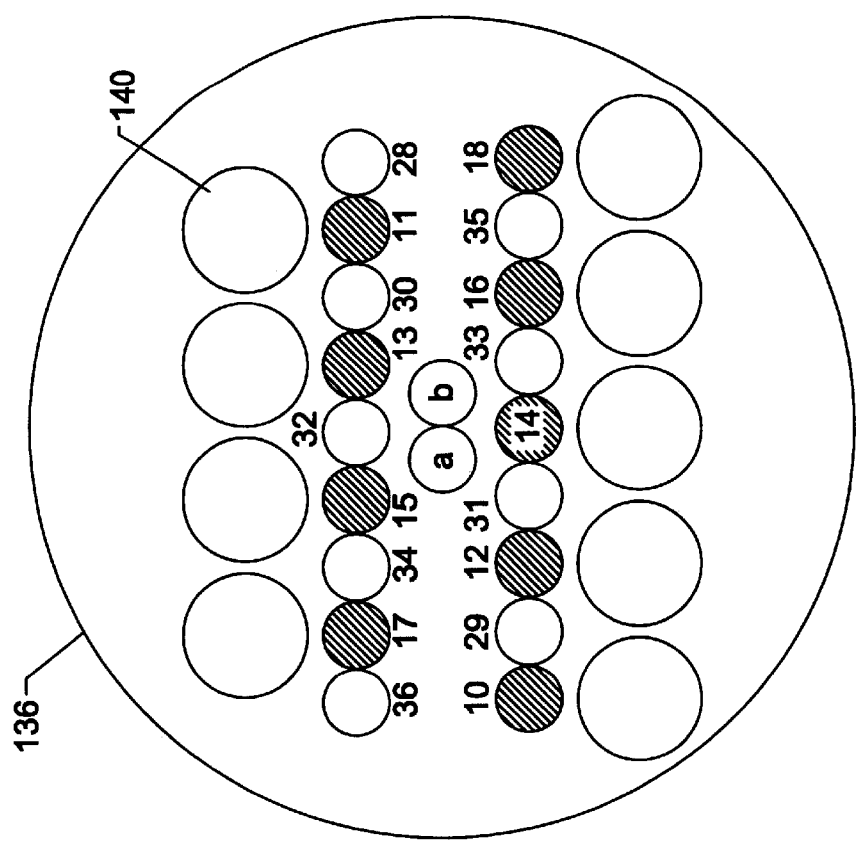
Figure 8A:
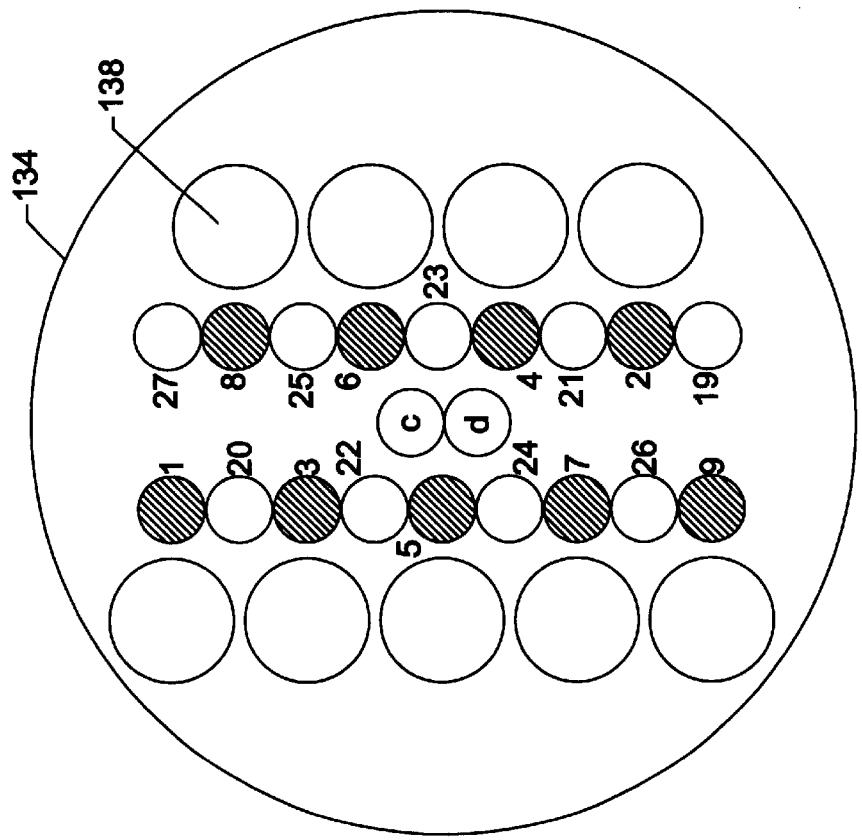

FIGS. 8A and 8B are frontal views of the construction surfaces of an amplifier according to one embodiment of the present invention illustrating the location of the pump beam reflectors of the optical amplifier.

Figure 9B:
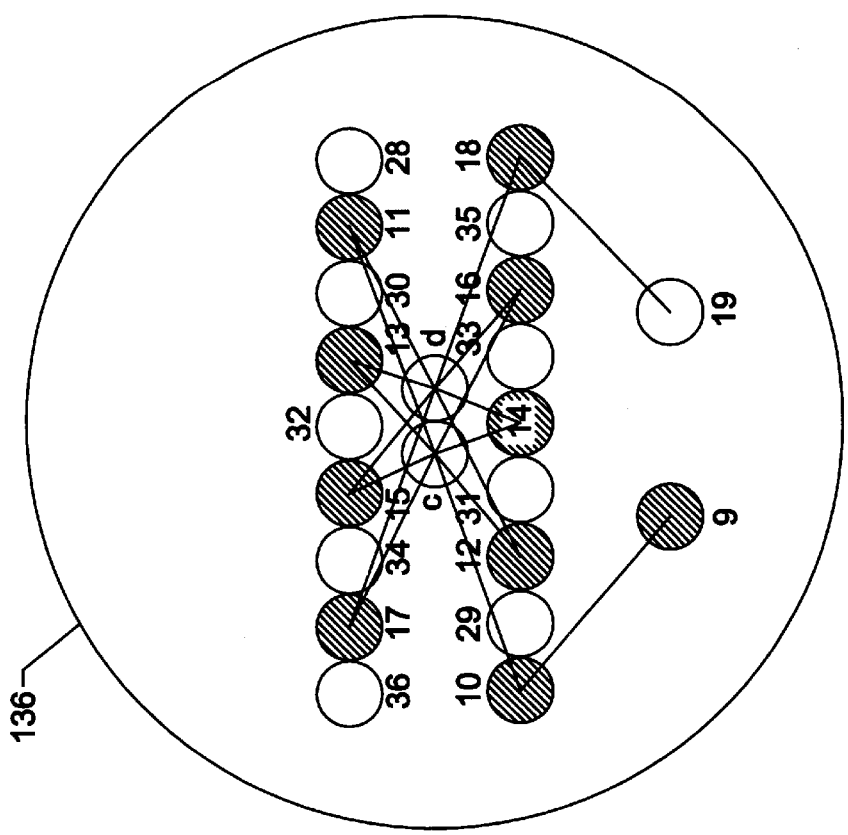
Figure 9A:
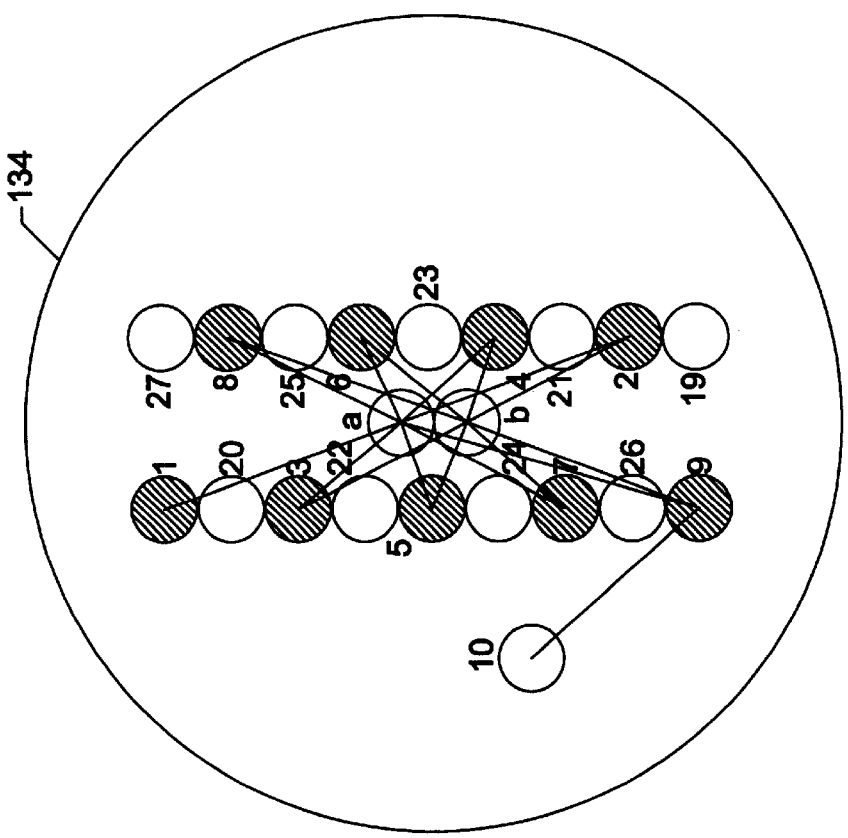

FIGS. 9A and 9B are frontal views of an optical amplifier for amplifying an optical signal according to one embodiment of the present invention illustrating a portion of the path of the optical beam through the optical amplifier.

Figure 10B:
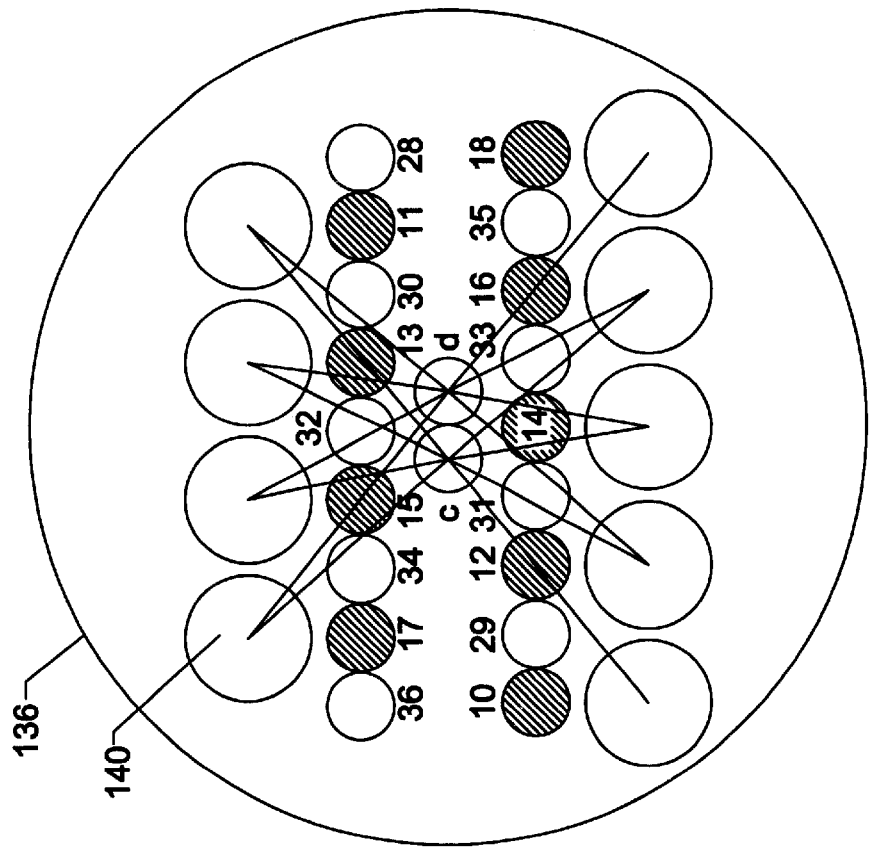
Figure 10A:
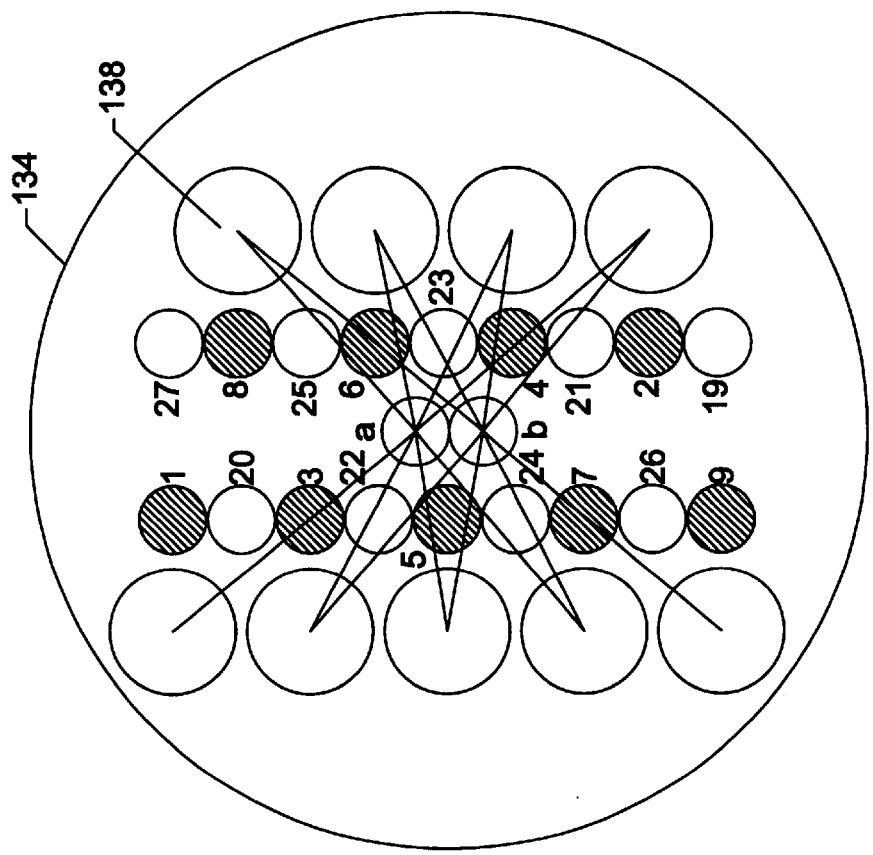

FIGS. 10A and 10B are frontal views of the construction surfaces of an optical amplifier for amplifying an optical signal according to one embodiment of the present invention illustrating the optical path of an optical pump beam for pumping the active reflectors of the optical amplifier.

Figure 11:
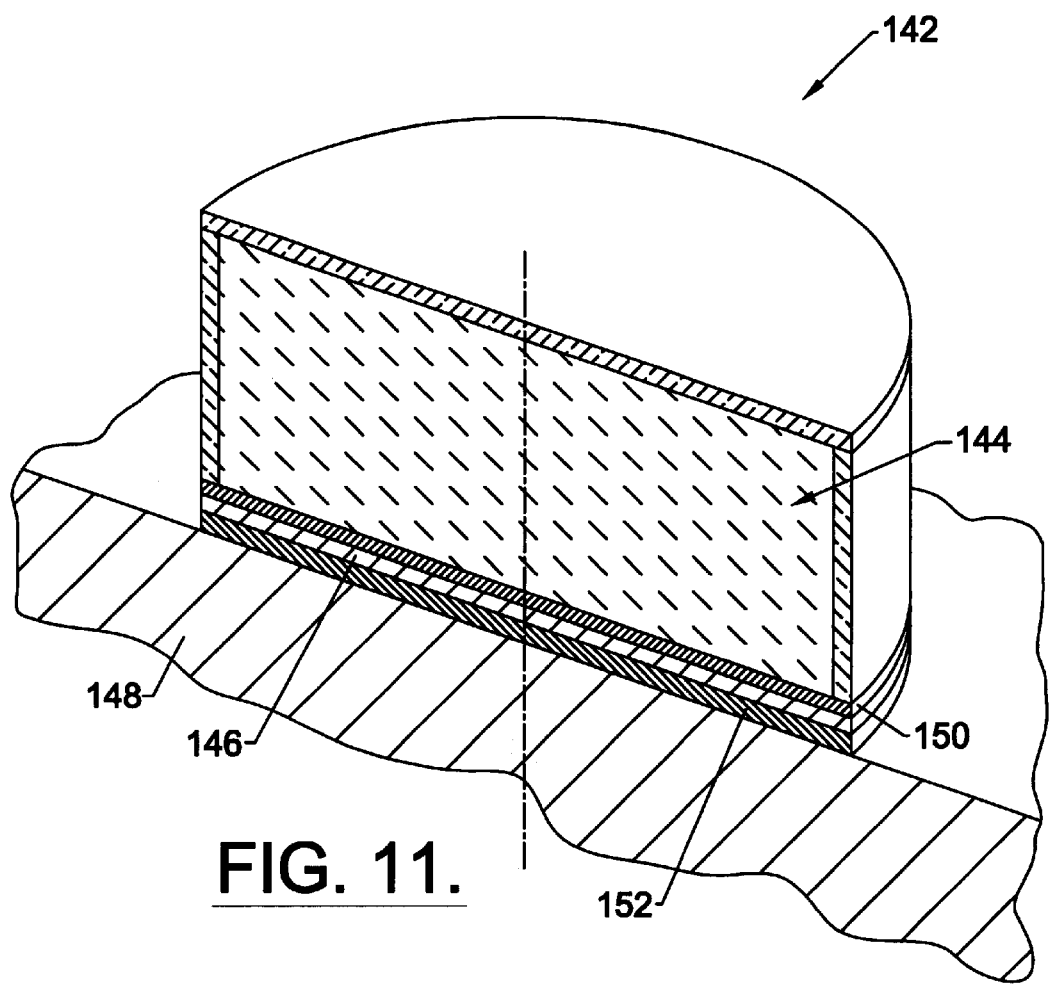

FIG. 11 is a cross-sectional view of an active reflector used in an optical amplifier according to one embodiment of the present invention.

Figure 12:
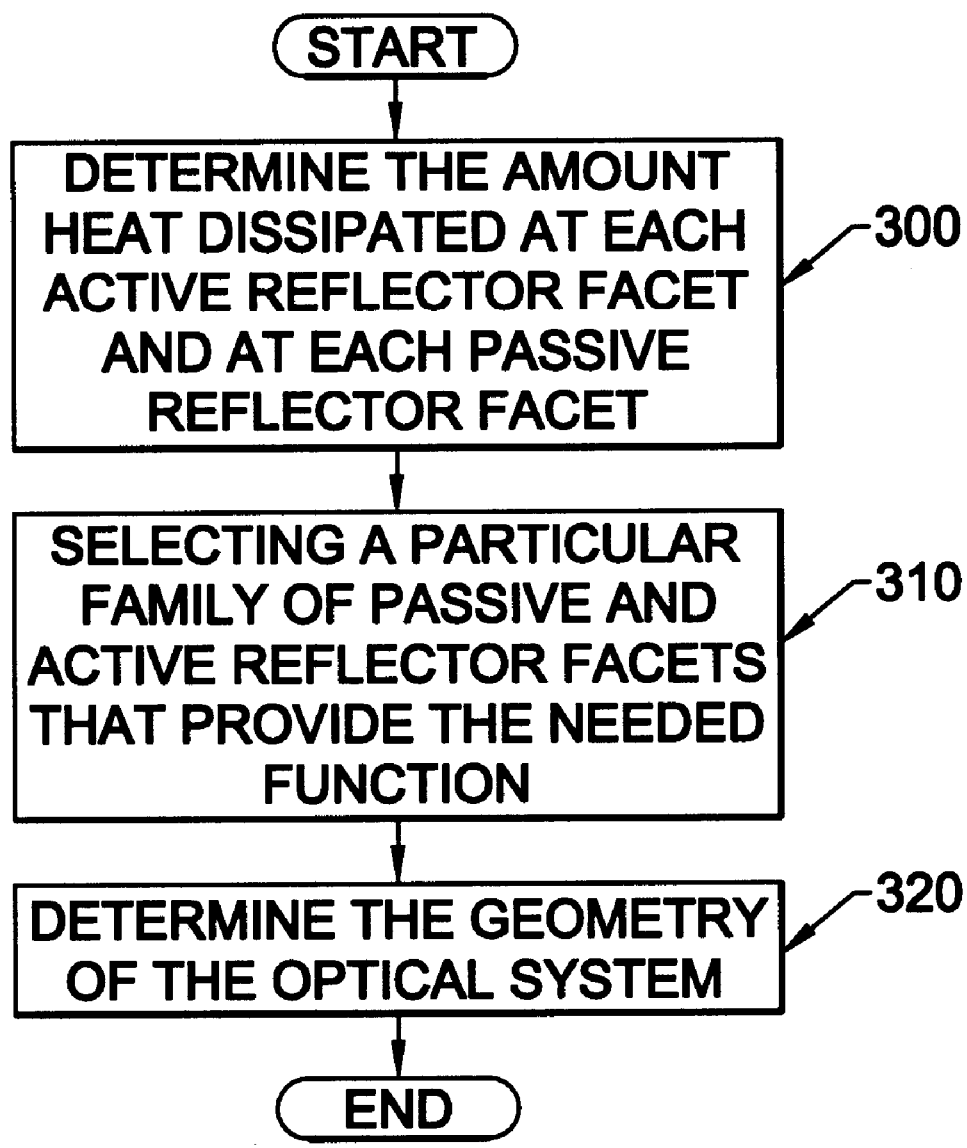

FIG. 12 is a block diagram of the operations performed to design an optical system that has active reflectors spaced apart such that the active reflectors may effectively reduce the operating temperature of the active reflectors according to one embodiment of the present invention.

Figure 13:
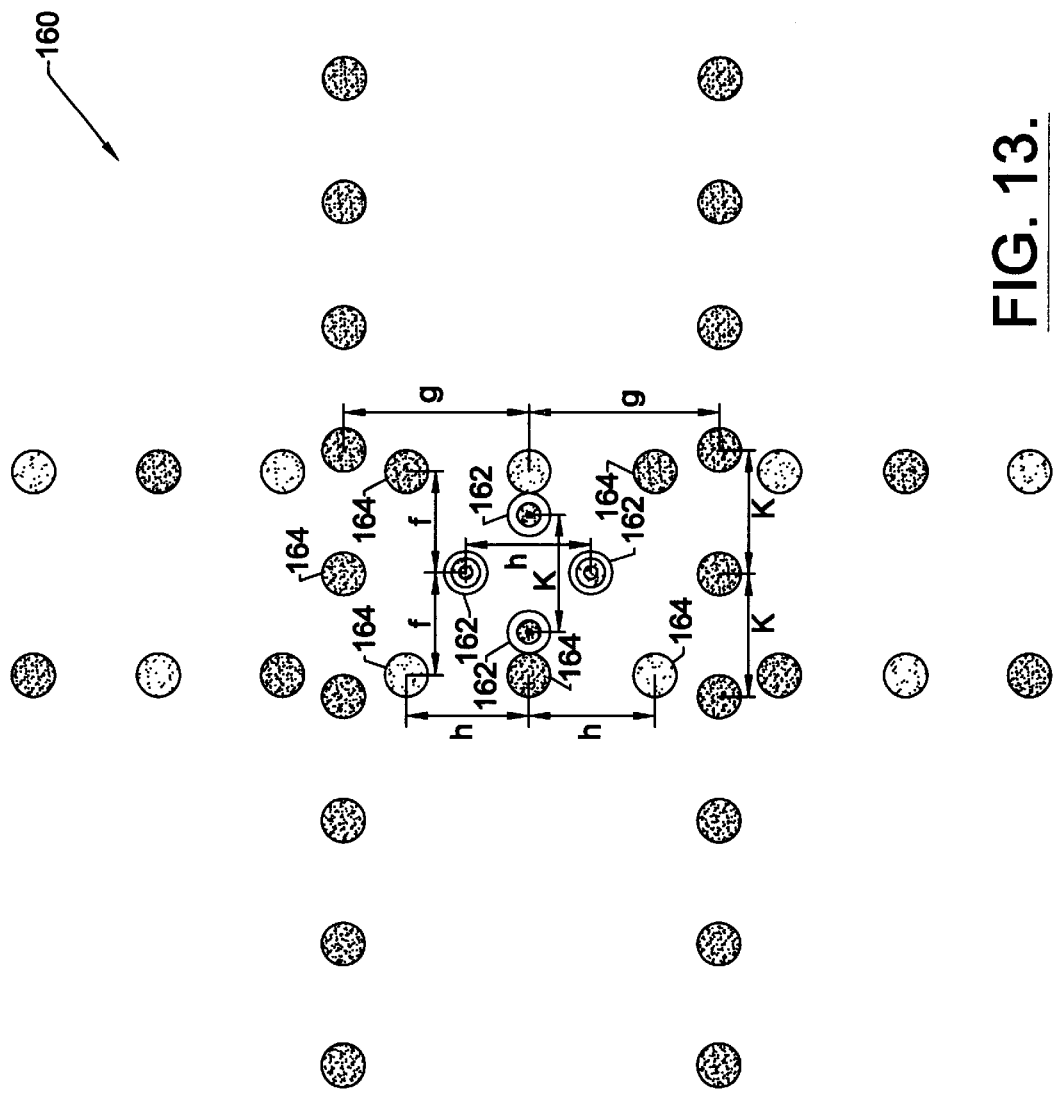

FIG. 13 is a view of a pattern of active and passive reflectors, where the active reflectors are spaced apart to allow for reduced operating temperature of the active reflectors according to one embodiment of the present invention.

Figure 14A:
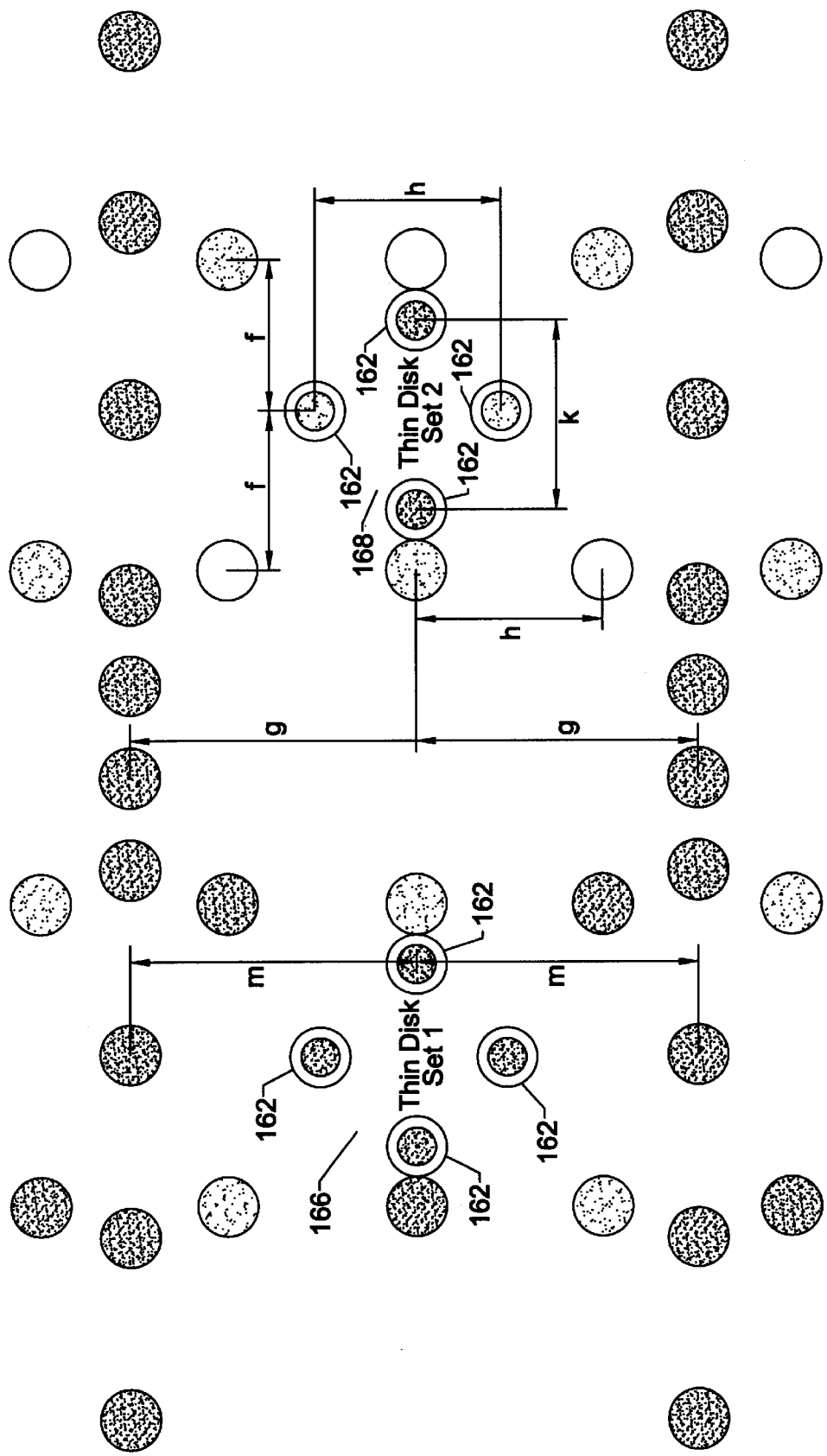

FIGS. 14A and B are views of a pattern of active and passive reflectors that have been interleaved or nested such that the heat from one active reflector does not add to the heating of the another active reflector to thereby reduce the operating temperature of the active reflectors according to one embodiment of the present invention.

Figure 15:
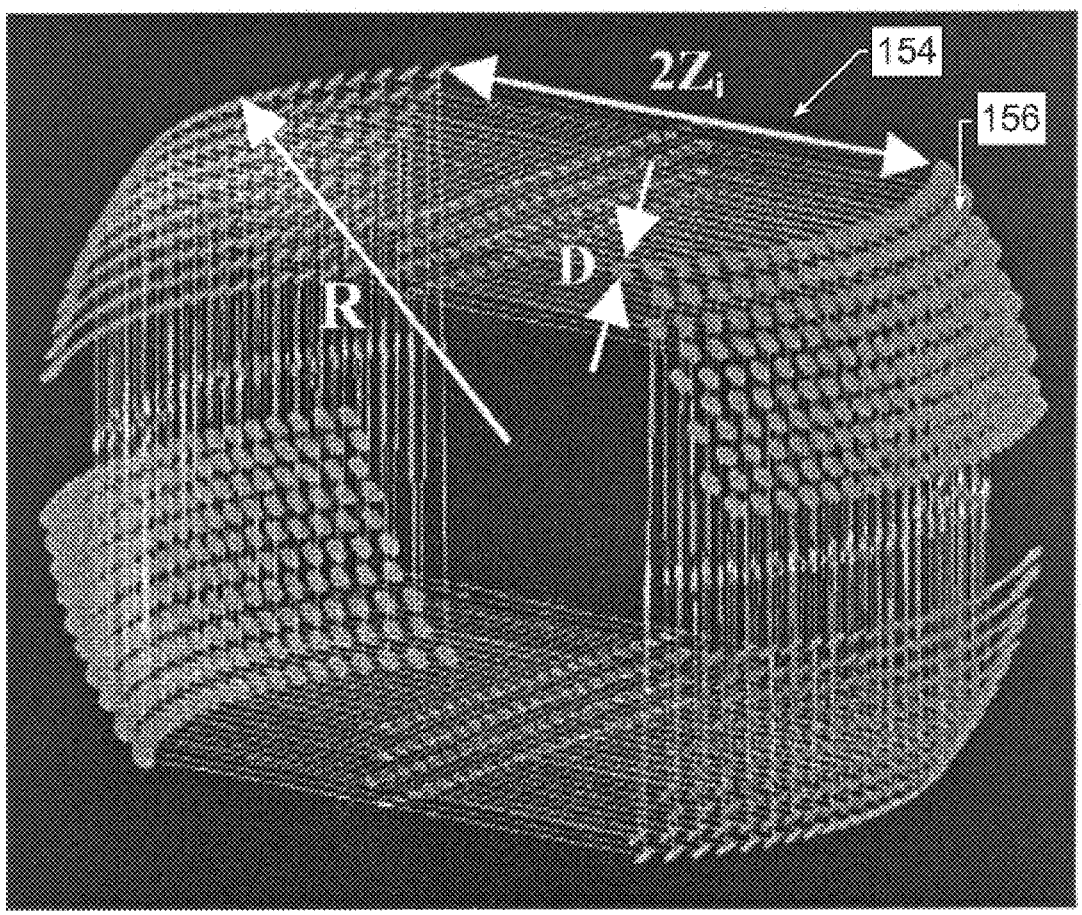

FIG. 15 is three-dimensional view of a multi-pass laser gyroscope according to one embodiment of the present invention.

Figure 16:
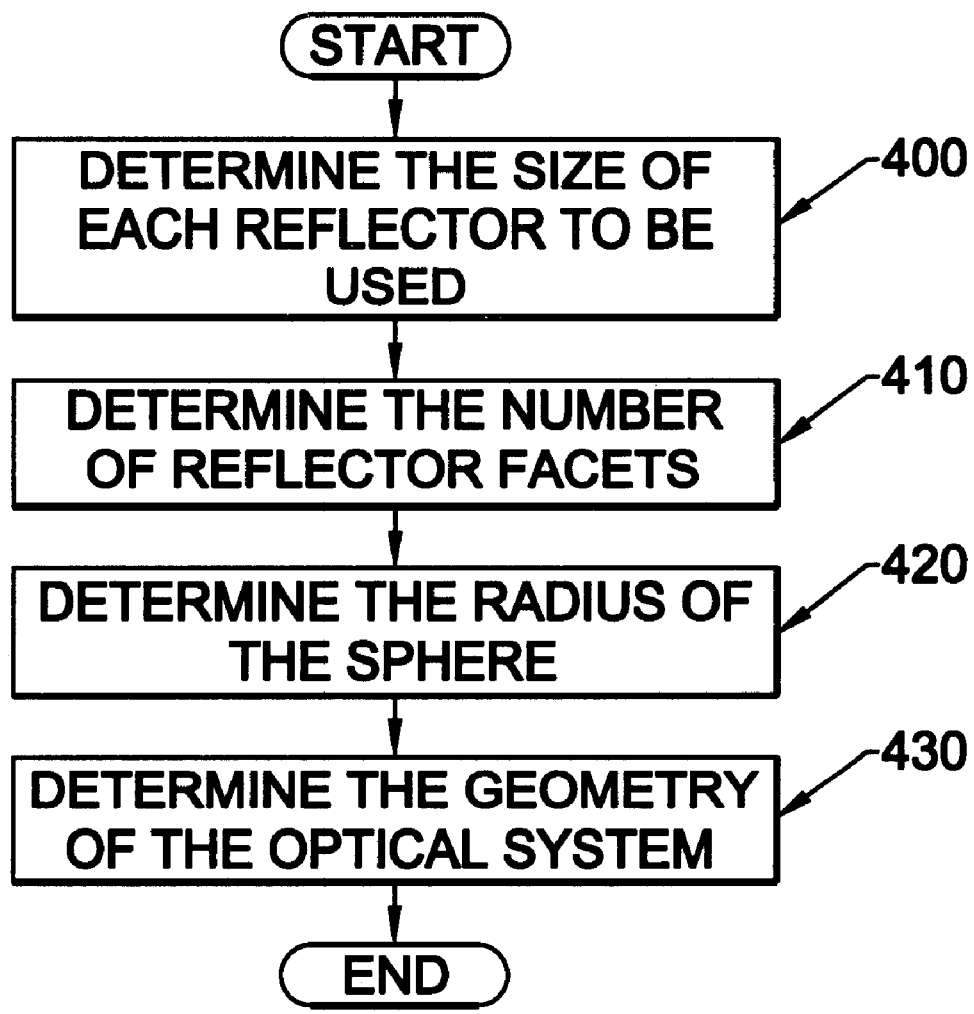

FIG. 16 is a block diagram of the operations performed to design a laser gyroscope having three optical beams for sensing rotation in a three-dimensional coordinate system according to one embodiment of the present invention.

Figure 17:
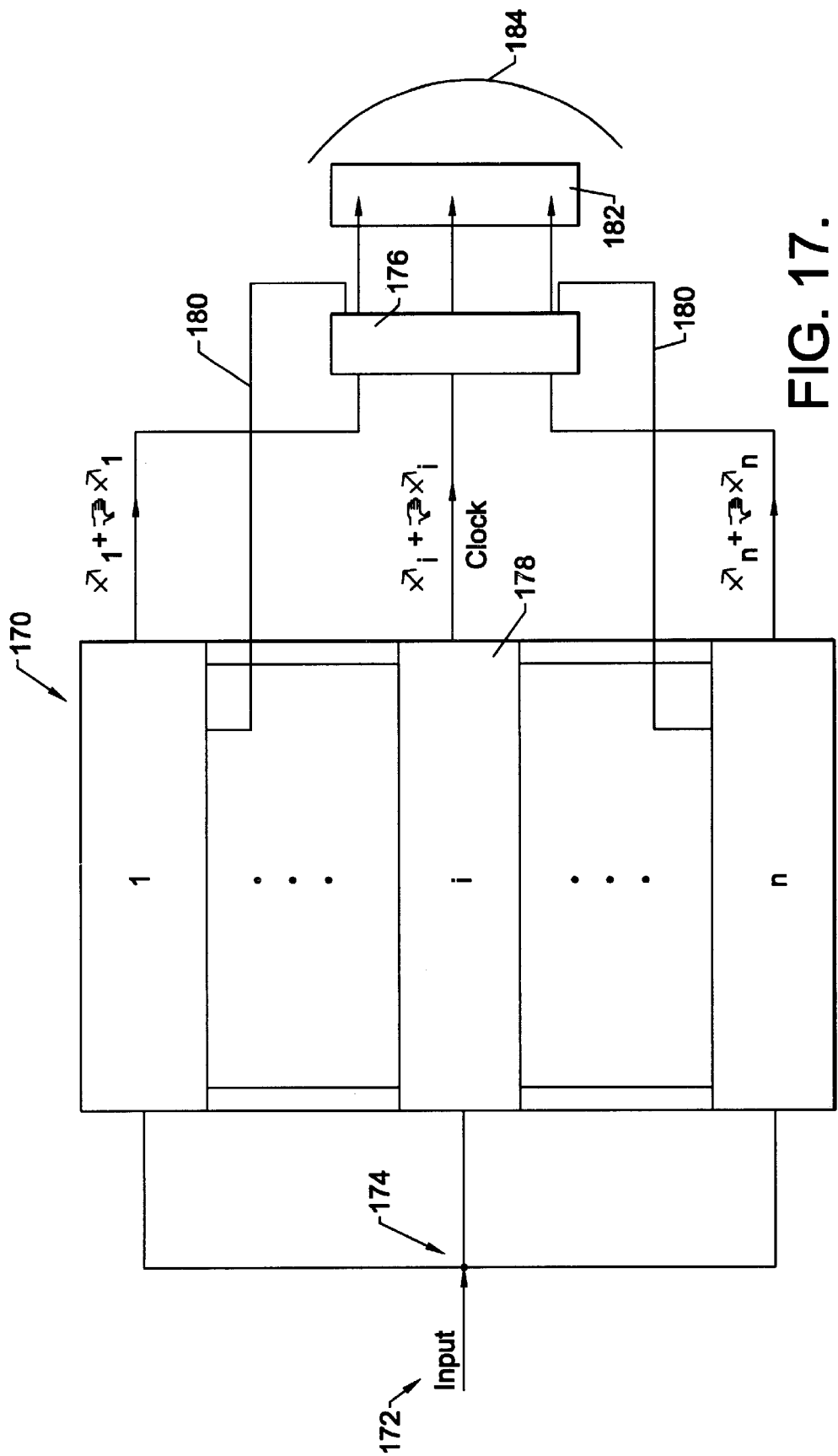

FIG. 17 is a block diagram of an apparatus for splitting a wavefront into individual optical beams, amplifying the optical beams, and recombining the optical beams while controlling the phase of the individual beams according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above and provided in more detail below, the present invention provides optical systems and methods that use a plurality of optical reflectors to fold the optical path of an optical beam used in the optical system. By folding the optical path of the optical beam, the optical system and method of the present invention can in one instance minimize the over-all volume and mass of the optical system. Further, using the folding aspects of the optical reflectors, the optical system and method of the present invention may also reduce the operating temperature of the active reflectors. Specifically, the active reflectors of the optical system that generate heat may be spaced farther apart such that the heat from one active reflector does not add to the heating of another active reflector to thereby reduce the operating temperature of the active reflectors. The passive reflectors used to fold the optical beam may be orientated such that the optical beam is directed to the spaced apart active reflectors.

Further, the optical system and method of the present invention may also be used to create a laser gyroscope having three optical beam paths for sensing rotation in three coordinate directions. In this embodiment, the optical system and method of the present invention positions the optical reflectors within the optical system such that the optical reflectors fold each of the optical beams into helical propagation paths. The optical paths are spaced closely together, such that the optical beams propagate within the defined volume of the optical system in a minimized volume.

The present invention also includes a method for designing an optical system to perform a desired function using an optical beam that propagates along an optical path within the optical system. The method designs the optical system such that it has at least one of a minimized size and reduced operating temperature characteristic. The method includes the step of first determining the desired optical path of the optical beam as it propagates through the optical system to perform the desired function. Next the method determines the desired characteristic of the optical beam and the desired number of active reflectors needed to create the desired characteristics of the optical beam. Using this information, the method determines the number and position within the optical system of passive reflectors required to systematically fold the optical beam into a structured optical path within a defined volume of the optical system such that the optical beam performs the desired function of the optical system. The method of the present invention also at least minimizes the volume of the optical system or reduces the operating temperature of the active reflectors in the optical system.

For example, the optical system and method of the present invention may be used to design an optical amplifier that amplifies an optical beam to a desired power level while minimizing the mass and volume of the optical amplifier. The optical amplifier according to this embodiment of the present invention is a multi-pass optical system that folds optical path of the optical beam into smaller volume using passive reflectors. The passive reflectors redirect the optical beam such that it is repeatedly directed on active reflectors located in the optical amplifier. Each time the optical beam impinges on an active reflector, the power from the active reflector increases the gain of the optical beam. The passive reflectors used to direct the optical beam are positioned such that the optical beam impinges on the active reflectors a desired number of times to thereby energize the optical beam to a selected power level. Importantly, the passive and active reflectors are "packed" or positioned within a confined area to thereby minimize the over-all volume and mass of the optical amplifier.

Provided below is a detailed description of an optical amplifier and method for amplifying an optical beam according to the present invention. These embodiments of the present invention are provided as illustrations and are not considered to limit the scope of the invention. Specifically, the embodiments provided below describe an optical amplifier for amplifying an optical beam in the kilowatt range. However, the discussion provided below is meant to only illustrate the present invention. It must be understood that different configurations of the optical amplifiers according to the present invention can be designed for different selected power gains. Further, it must be understood that many of the concepts are not limited to multi-pass optical amplifiers, but may also be used to design other multi-pass optical systems, including for example, multi-pass optical oscillators, phase coherent multi-amplifier arrays, and laser gyroscopes, discussed later below. Further, it may be used to design optical system having reduced operating temperatures.

As discussed above, the present invention provides an optical system and method that may be used to minimize the mass and volume of an optical amplifier by using a plurality of optical reflectors to fold the optical path of the optical beam. To provide a better understanding of the present invention, FIG. 4 initially illustrates a general optical amplifier 100 according to the present invention. The optical amplifier includes two construction surfaces, 102 and 104, that are in facing relationship to each other. Located on each construction surface are active reflectors. Specifically, two active reflectors, a and b, are located on construction surface 104, while two active reflectors, c and d, are located on construction surface 102. As discussed later, these active reflectors are designed to amplify and reflect an optical beam that is introduced into the optical amplifier. Importantly, the optical amplifier 100 also includes columns 106 of passive reflectors located on either side of the active reflectors. The columns of passive reflectors on each construction surface each include two sets, 108 and 110, of passive reflectors. Each set of passive reflectors is oriented on the construction surface to direct the optical beam to the active reflectors located on the opposite construction surface. As the optical beam is impinged on the active reflectors, the optical beam is both amplified and reflected. Each group of passive reflectors further includes passive reflectors that redirect the optical beam after it has reflected between all of the passive reflectors and the associated active reflectors to a new group of passive reflectors so that the optical beam may be amplified by the next group of passive and active reflectors.

As discussed, the present invention provides a multi-pass optical amplifier that is designed to not only amplify an optical signal to a selected power level, but also minimize the over-all volume and mass of the optical amplifier. To minimize the volume and mass of the optical amplifier, the passive reflectors of the optical amplifier of the present invention fold the path of the optical beam.

As an illustration of the present invention, provided below is a detailed description of an optical amplifier according to one embodiment of the present invention that amplifies an optical beam in the kilowatt range. The optical amplifier includes a required number of active and passive reflectors to energize the optical beam to the kilowatt level, while minimizing the overall volume and mass of the optical amplifier by folding the path of the optical beam into a minimized volume.

With reference to FIG. 5, the present invention provides a method for designing an optical system to perform a desired function using an optical beam that propagates along an optical path within the optical system. Specifically, first the method of the present invention determines the desired optical path of the optical beam as it propagates through the optical system to perform the desired function. (See step 200). In the case of the present invention, the optical beam path must be directed at the active reflectors to thereby amplify the optical beam. Next, the method determines the desired characteristic of the optical beam. (See step 210). In the present case, this includes determining the desired beam width and the desired degree of amplification of the optical beam, which is approximately 3 mm and 1 kW of power.

Using this criteria, the method next determines the number of active reflectors required to create the optical amplifier. (See step 220). Specifically, for each pass of the optical beam through the active reflector, the optical beam is gained by 1.25. In the present example, the optical amplifier can be designed to allow a maximum of eight (8) passes through each active reflector. As such, in the present embodiment, approximately 250 W can be extracted from each active reflector. To determine the number of active reflectors used, this value is divided into the selected energy level, (i.e., 1000/250=4). As such, in the present embodiment, approximately 1 kW can be extracted from the active reflectors with 32 passes.

The method next determines the number of passive reflectors required to perform the 32 passes. (See step 230). For this embodiment, the passive reflectors are grouped together in groups of eight (8) with an additional passive reflector to redirect the optical beam to a next set of reflectors. Given the number of required passes, it is determined that 4 groups of passive reflectors are needed to perform the 32 passes.

Given the number of passive and active reflectors, a geometry for the optical amplifier can next be determined. (See step 240). Specifically, the number of active and passive reflectors, along with the selected beam characteristics may be provided to the developed software program which utilizes the Advanced Systems Analysis Program ASAP™ developed by Breault Research Organization, Inc. The program provides the positions for the various reflectors to thereby design the optical amplifier to have a minimized volume and mass.

Further, not previously mentioned in the discussion of FIG. 5, the number and placement of the pump beam reflectors should be determined for pumping the active reflectors with an optical pump beam. (See step 250). In this particular embodiment, the design uses 8 pump beam reflectors for each group of active reflectors located proximate to the active reflectors.

To provide a better detail of the minimization aspects of the present invention, provided below is a brief discussion of the position of the passive and active reflectors on a symmetrical confocal structure to form a compact optical amplifier. This discussion illustrates the position and orientation of active and passive reflectors in an optical amplifier. It must be understood that the following discussion, although given in the context of an optical amplifier, is not limited to optical amplifiers and provides a technique to ascertain designs for other multi-pass optical systems, such as optical oscillators and gyroscopes.

Specifically, with reference to FIG. 6, a frontal view of construction surface 112 is illustrated. The construction surface has a defined area with a height of $2Y_{max}$ and a width of $2X_{max}$, where $Y_{max}$ and $X_{max}$ are measured from the center 113 of the construction surface. Additionally, FIG. 6 illustrates active reflectors 114 and 116 located on the opposed construction surface about center of the construction surface and spaced vertically from each other by a distance h from their centers. The two active reflectors are used to amplify an optical beam incident on the optical amplifier.

It is important to note here that two active reflectors on each construction surface are used in an optical amplifier configuration. This is because if a single active reflector were placed at the center of the spherical construction surface, the optical beam would be reflected between the active reflector and two passive reflectors and create an optical oscillator. However, by placing two active reflectors in the configuration illustrated in FIG. 4, the optical beam is systematically directed between the active reflectors and a series of passive reflectors, allowing the beam to be amplified, but also, eventually redirected out of the optical amplifier.

With reference to FIG. 6, the construction surface further includes columns 118 of passive reflectors located proximate to the active reflectors for directing the optical beam to impinge on active reflectors located on the opposed construction surface, not shown. Further, each column includes a first and second set, 120 and 122, of passive reflectors in each column. The first set of reflectors are used to direct the optical beam at the active reflectors located on the opposed construction surface during a first time, and the second set of reflectors are used to direct the optical beam at the active reflectors 114 and 116 during a second time. In order for each column to include two sets of passive reflectors, the diameter of each passive reflector must be less than or equal to the separation h between the first and second active reflectors 114 and 116. Additionally, each group of passive reflectors includes passive reflectors oriented to direct the optical beam to a new set of passive reflectors on the opposed construction surface after it has been amplified by the current group of passive reflectors and associated active reflectors.

The number of passes that can be accomplished within the given area of the multi-pass optical device can be determined by observing one of the sets, 120 or 122, of the passive reflectors from one of the columns. Specifically, as $Y_{max}$ increases by a value of h, the total distance is increased by 2h, (i.e., the height of the construction surface increases by h in both the bottom and top since $Y_{max}$ is measured from the center). This, in turn, increases the number of passes through the active reflectors by 2 passes. Thus, the effect of the maximum Y value, $Y_{max}$, on the number of passes for a set of passive reflectors in a column of passive reflectors is:

$$m_y = \frac{2 \cdot Y_{max}}{h}$$

However, as discussed above, one reflector in the set is a routing reflector that routes the optical beam to a set of reflectors on the opposed construction surface, not shown, such that the optical beam is amplified by impinging the optical beam on the active reflectors 114 and 116. Thus, one pass must be subtracted from the total amount $m_y$ to provide the number of passes for the set of passive reflectors.

$$m_y = \frac{2 \cdot Y_{max}}{h} - 1$$

Further, because there are two sets, 120 and 122, of passive reflectors in each column, the total number of passes per column based on the height of the construction surface is:

$$m_y = \left[\frac{2 \cdot Y_{max}}{h} - 1\right] \cdot 2.$$

Next, it is determined the number of passes that are added for each incremental increase in the width of the construction surface, (i.e., $X_{max}$). For each additional column of passive reflectors that are added, the number of passes calculated for $Y_{max}$ is multiplied. For example, if 2 sets of columns are used, such as shown in the FIG. 6, the value $m_y$ is multiplied by 2. However, if 3 sets of columns are present, $m_y$ is multiplied by 3.

As illustrated in FIG. 6, the first set of columns 124 are a horizontal distance of f from the center of the construction surface and the second set of columns 126 are a horizontal distance g. In practice, the distance g does not have to match the distance h in order for the optical beam to be reflected between the second column of passive reflectors and the active reflectors on the opposed construction surface. The sets of columns are mutually exclusive of one another.

For maximum "packing" or positioning of passive reflectors on the construction surface, however, the columns should be equidistant apart. In this configuration, g=2f.

As such, for each increment of $X_{max}$ by h, the number of sets of rows is $$m_x = \frac{X_{max}}{f}.$$

Thus, the number of passes for each increment of $X_{max}$ is $m_x \cdot m_y$ or:

$$m_{yx} = \left[\frac{2 \cdot Y_{max}}{h} - 1\right] \cdot 2 \cdot \frac{X_{max}}{f}.$$

In addition to the columns of passive reflector located on either side of the active reflectors, passive reflectors may also be located in the areas, 128 and 130, above and below the active reflectors. To place passive reflectors in this area, two routing passive reflectors are required. As such, the total number of passive reflectors placed above and below the active reflectors minus two for re-routing the optical beam is equal to the number of passes gained by placing passive reflectors in these areas. Further, the number of passes is reduced by two more because of the space taken up by the two active reflectors of the opposed construction surface. As such, the total number of passes due to the placement of passive reflectors above and below the active reflectors is equal to:

$$\frac{Y_{max}}{h} - 2 - 2 = \frac{Y_{max}}{h} - 4.$$

This equation is not multiplied by $X_{max}$, as it only appears above and below the active reflectors.

Therefore, the total number of passes for each construction surface of the optical amplifier is:

$$m_1 = \left[\left(\frac{2 \cdot Y_{max}}{h} - 1\right) \cdot 2 \cdot \frac{X_{max}}{f}\right] + \left(\frac{Y_{max}}{h} - 4\right).$$

This value is then doubled because of the opposed construction surface, thereby providing the total number of passes in terms of the maximum X and Y dimensions as:

$$m = 2 \cdot \left\{\left[\left(\frac{2 \cdot Y_{max}}{h} - 1\right) \cdot 2 \cdot \frac{X_{max}}{f}\right] + \left(\frac{Y_{max}}{h} - 4\right)\right\}.$$

This equation can also be expressed in terms of area. Specifically, if h=f=g/2, then the area of the construction surface is $A=((2 \cdot X_{max}) \cdot (2 \cdot Y_{max}))$, where A is the area of the "square" shown in the FIG. 6. Multiplying through in the above equation and replacing terms represented by $((2 \cdot X_{max}) \cdot (2 \cdot Y_{max}))$ with A:

$$m = 2 \cdot \left\{\left[\left(\frac{A}{h^2} - \frac{2 \cdot X_{max}}{h}\right)\right] + \left(\frac{X_{max}}{h} - 4\right)\right\} = 2 \cdot \left[\frac{A}{h^2} - \frac{X_{max}}{h} - 4\right] \quad (1)$$

As such, the number of passes that can be made through the active reflectors of an optical amplifier for an optical amplifier having a given size can be determined by Equation 1.

To explain this more fully, provided below is the determination of the number of passes that are available in a cube having all sides of length L. To determine the number of passes that may be implemented in the cube, the length h between the reflectors must first be determined. Typically, the length h must be determined to alleviate beam ripple due to beam waist. Specifically, the length h is typically limited by the confocal parameter:

$$2Z_0 = \frac{2\pi\omega_0^2}{\lambda},$$

where $\omega_0$ is the beam waist radius. To make the optics large enough to cause less than 1% beam ripple, the radii of the optics, h/2, should be $$\frac{h}{2} = 4.6\sqrt{2} \cdot \omega_0$$

so that the edges of the reflectors do not affect the beam. Therefore, $$\omega_0 = \frac{h}{9.2\sqrt{2}}.$$

In the configuration, the beam waist occurs at the active reflectors. Thus $$2L = 2Z_0 \Rightarrow L = \frac{\pi\omega_0^2}{\lambda}$$

and $$\omega_0 = \sqrt{\frac{L\lambda}{\pi}} = \frac{h}{9.2\sqrt{2}}$$

giving $$h = 9.2\sqrt{\frac{2L\lambda}{\pi}}.$$

Recognizing that $A=L^2$ in Equation 1 and substituting the value for h above into Equation 1 gives $$m = 2 \cdot \left[ \frac{L^2}{(9.2)^2 \frac{2L\lambda}{\pi}} - \frac{X_{max}}{9.2\sqrt{\frac{2L\lambda}{\pi}}} - 4 \right] \quad (2)$$

$$= 2 \cdot \left[ \frac{L\pi}{(9.2)^2 2\lambda} - \frac{\sqrt{\pi} X_{max}}{9.2\sqrt{2L\lambda}} - 4 \right]$$

For L>>h, the first term in Equation 2 dominates and $$m \approx \frac{L\pi}{(9.2)^2 \lambda}.$$

Thus, as illustrated above, the present invention provides a method for design multi-pass optical systems such that the required number of optical paths can be achieved in a minimized area.

As discussed, the above determination of the number of passes that may be implemented in an area should not be limited to optical amplifiers. The concepts described above may also be used to determine of passes for other multi-pass systems, such an optical oscillator or a laser gyroscope.

With reference to FIG. 7, an embodiment of the present invention is illustrated, which shows an optical amplifier 132 according to one embodiment of the present invention for amplifying an optical beam by a selected power level in the range of 1 kW. Specifically, the optical amplifier of this embodiment includes first and second construction surfaces in facing relationship to each other, 134 and 136, respectively. Located on each construction surface are two active reflectors. Specifically, active reflectors a and b are located on the second construction surface 136, while active reflectors c and d are located on the first construction surface 134. Additionally, a first and second group of passive reflectors are located on the first and second construction surfaces. Passive reflectors designated as 1–9 and 20–27 are located on the first construction surface 134, while passive reflectors designated as 10–19 and 28–36 are located on the second construction surface 136.

As illustrated in FIG. 7, in this embodiment of the present invention, the active reflectors and passive reflectors located on the second construction surface are offset 90° with respect to an axis defined by the active reflectors on the first construction surface. The active reflectors are preferably arranged in this manner to minimize any possible laser action between the two groups of active reflectors. It must be understood that it is not a requirement that the active reflectors be offset from each other but merely design choice.

In this embodiment, the first group of passive reflectors are positioned on the first construction surface to direct an optical beam at the group of active reflectors, a and b, located on the second construction surface, and the second group of passive reflectors are positioned on the second construction surface to direct an optical beam at the group of active reflectors, c and d, located on the first construction surface. For purposes of aligning the passive reflectors with their respective active reflectors, the first and second construction surfaces of this embodiment are symmetrical confocal surfaces. In this embodiment, the planes of the active reflectors, a, b, c, and d, on which the optical beam impinges are normal to a line drawn between the axes of the first and second construction surfaces. Further, the passive reflectors designated as 2–7, 11–17, 20–26, and 29–35 are located on the construction surfaces such that the planes of the passive reflectors on which the optical beam impinges are parallel to a line tangent to the symmetrical confocal surface of the construction surfaces. More specifically, a line normal to the planes of these reflectors passed through the center of the opposed construction surface.

As discussed, an important aspect of the present invention is the ability of the passive reflectors to direct the optical beam such that the optical beam is amplified by all of the active reflectors. In light of this, in the embodiment illustrated in FIG. 7, the optical amplifier of the present invention further includes passive reflectors that redirect the optical beam after it has been reflected between all of the passive reflectors and associated active reflectors of one group to the passive reflectors of a next group. These passive reflectors are designated as reflectors 9, 10, 18, 19, 27, and 28. Further passive reflectors 1 and 36 are used respectively to direct an optical beam into the optical amplifier and to direct an optical beam out of the amplifier after it has been amplified. All of these reflectors are oriented such that the planes of the passive reflectors on which the optical beam impinges is rotated slightly with respect to a line tangent to the symmetrical confocal surface of the construction surfaces. The orientation of these reflectors is chosen so as to redirect the optical beam in a manner that optimally continues the trajectory of the beam path to the next set of passive reflectors.

It is noted here that the passive reflector 36 could in some embodiments be a recursive reflector. In these embodiments, the amplified optical beam is reversed at the very end and reflected back on itself. This would double the number of passes for the optical beam for amplification. Further, in this embodiment, to extract the amplified optical beam, the polarization of the passive reflector 38 could be altered to allow the amplified optical beam to be extracted.

With reference to FIGS. 8A and 8B, in addition to the passive and active reflectors, the optical amplifier of this embodiment also includes pump beam reflectors for providing an optical pump beam to the active reflectors. Specifically, FIGS. 8A and 8B illustrate frontal views of the first and second construction surfaces, 134 and 136, respectively. Located on each construction surface is a set of pump beam reflectors, 138 and 140, respectively. These pump beam reflectors are typically positioned on the construction surfaces outside the locations of the passive and active reflectors. Further, the pump beam reflectors are typically larger in size and spaced further apart than the passive reflectors because of the greater divergence of the optical pump beam. A description of the operation of these pump beam reflectors is provided later below.

As illustrated in FIG. 7, the optical amplifier of one embodiment of the present invention includes a plurality of passive and active reflectors to systematically amplify an optical beam to a selected power level. The pattern of two active reflectors located on each construction surface and the two groups of passive reflectors provides an economic and compact system for amplifying an optical signal. Specifically, the passive reflectors fold the optical path of the optical beam into a minimized volume, thereby decreasing the volume and mass of the optical amplifier. The operation of the passive and active reflectors for the illustrated optical amplifier of the present invention is shown in FIGS. 9A and 9B.

Specifically, with reference to FIGS. 9A and 9B, the path of an optical beam through the optical amplifier of the present invention is illustrated. FIGS. 9A and 9B depict the propagation of the optical beam through the first 16 paths of the optical beam. In this context, an optical path is defined as the optical beam passing from a given passive reflector to an active reflector on the opposing construction surface and then returning to a passive reflector on the original construction surface. It must be noted, that FIG. 9A duplicates passive reflector 10, which is physically located on the second construction surface 136, proximate to the first construction surface, and FIG. 9B duplicates passive reflectors 9 and 19, which are physically located on the first construction surface 134, proximate to the second construction surface in order to illustrate more clearly the path of the optical beam.

As illustrated, the optical path of the optical beam begins with receipt of the beam by the passive reflector 1. As stated previously, passive reflector 1 is optically oriented such that the plane of the passive reflector on which the optical beam impinges is rotated slightly with respect to a line tangent to the symmetrical confocal surface of the construction surface. As such, the passive reflector 1 directs the optical beam to the first subset of passive reflectors located on the first construction surface. Specifically, the optical beam follows the path 1-a-2-b-3-a-4-b-5-a-6-b-7-a-8-b-9, meaning that the optical beam passes from passive reflector 1 on the first construction surface 134 to the active reflector a on the second construction surface 136 and back to passive reflector 2 on the first construction surface. From the passive reflector 2, the optical beam next travels to active reflector b and from the active reflector b to the remaining passive reflectors 3–8 in the first subset of reflectors located on the first construction surface.

Importantly, in a conventional optical amplifier having simple spherical and simple flat surfaces, the conventional optical beam would be limited to these first eight passes. However, as illustrated in FIG. 9, after the first 8 passes, the departure from the tangent to the construction surface of passive reflectors 9 and 10, redirects the optical beam for a second pattern of 8 passes. These connecting passive reflectors are important in linking the four families of eight passes each. For example, after the optical beam has completed the first eight passes, the passive reflector 9 directs the optical beam to passive reflector 10. The optical beam then proceeds along the following path between passive reflectors 10–18 and active reflectors c and d: 10-c-11-d-12-c-13-d-14-c-15-d-16-c-17-d-18.

Again, after the optical beam has propagated through the second set of 8 passes, the optical beam is redirected by passive reflector 18 and 19, whose orientation departs from the tangent to the construction surface. As such, the optical beam is redirected for the next 8 passes through 18-19-b-20-a-21-b-22-a-23-b-24-a-25-b-26-a-27. Again, the optical beam is redirected by passive reflectors 27 and 28 for a remaining 8 passes 27-28-d-29-c-b-30-d-31-c-32-d-33-c-34-d-35-c-36, (not shown in FIG. 9). The optical beam then exits from passive reflector 36. It must be noted that the orientation of passive reflector 36 can be varied within reasonable limits to adjust the direction of the output of the optical beam.

With reference to FIGS. 10A and 10B, the operation of the pump beam reflectors is illustrated. As stated previously, the pump beam reflectors located on one construction surface are used to direct a pump beam at active reflectors located on the opposed construction surface. In this regard, FIG. 10A illustrates the pump beam reflectors positioned on the first construction surface 134 for pumping the active reflectors a and b located physically on the second construction surface, and FIG. 10B illustrates the pump beam reflectors located on the second construction surface 136 for pumping the active reflectors c and d located on the first construction surface. (Note FIGS. 10A and 10B, are frontal views of the construction surfaces with the active reflectors of the opposed construction surface located in front of the construction surfaces to better illustrate the optical paths of the optical pump beam.).

As illustrated, the pump beam reflectors are oriented to direct the optical pump beam from the pump beam reflectors on one construction surface to the active reflectors on the opposed construction surface. In this regard, with reference to FIG. 10A, the optical pump beam is received by the pump beam reflectors, and the pump beam reflectors systematically direct the pump beam between each pump beam reflector and the active reflectors a and b. In some embodiments, the optical amplifier may include separate pump beams directed at the pump beam reflectors located on each construction surface. However, in a preferred embodiment, one of the pump beam reflectors located on the first construction surface is oriented such that after the optical pump beam has reflected between all of the pump beam reflectors on the first construction surface and the active reflector on the second construction surface, the optical pump beam is redirected to the pump beam reflectors on the second construction surface, where it is used to energize the active reflectors on the first construction surface. In an additional embodiment, one of the pump beam reflectors located on the second construction surface is recursive. In this embodiment, after the optical pump beam has reflected between all of the pump beam reflectors on the second construction surface and the active reflector on the first construction surface, the recursive pump beam reflector redirects the path of the optical pump beam such that it propagates back through the pump beam reflectors and active reflectors. In a further embodiment, the pump beam reflectors on the first construction surface may also include a recursive pump beam reflector that again redirects the optical pump beam signal to again follow the optical path between the pump beam reflectors and the active reflectors in a forward path.

It should be noted, that the reason the optical amplifier of the present invention typically uses a multi-pass pump beam configuration is to build the pump intensity to excite the laser-active layer. Further, it should be noted that although the optical amplifier illustrated in FIG. 7 pumps the active reflectors by directing an optical pump beam on top plane of the active reflectors, that the optical pump beam can instead be provided to the sides of the active reflectors. Finally, although not discussed, in some embodiments, it may be necessary to modify the structure of the active reflectors to properly couple the optical pump beam to them.

As illustrated above in conjunction with FIG. 9, the optical amplifier of the present invention folds the optical path of the optical beam in the amplifier such that 32 passes through the laser-active material thereby amplifies the optical beam. In this embodiment, the optical amplifier of the present invention uses active reflectors that not only amplify the optical beam but also reflect the optical beam. In this respect, each time the optical beam impinges on an active reflector, the active reflector actually amplifies the optical beam twice. Thus, in effect, in the embodiment described in FIG. 7, the optical amplifier amplifies the optical beam 64 times using 32 passes.

This concept is more specifically illustrated with reference to FIG. 11. FIG. 11 is cross-sectional representation of an active reflector according to one preferred embodiment of the present invention. The active reflector of this embodiment is a thin film disk and is more fully described in U.S. Pat. No. 5,553,088 to Brauch, the contents of which are incorporated herein by reference. With reference to FIG. 11, the active reflector 142 includes both a laser-active layer 144 and a reflective layer 146. When the optical beam impinges on the laser-active layer, it is initially amplified to a first power level. Further, after the optical beam is reflected by the reflective layer 146, the laser-active layer again amplifies the optical beam to a second power level. As such, the number of required optical passes needed to amplify the optical signal is reduced from 64 to 32 by using the thin film active reflector. This, in turn, reduces the number of required reflectors and overall volume and mass of the optical amplifier.

Importantly, the optical amplifier of the present invention illustrated in FIG. 7 energizes an optical beam incident on the optical amplifier by a selected power level in the range of 1 kW. The optical amplifier of this illustrative embodiment uses active reflectors having laser-active layers of $Yb^{3+}$. Each active reflector provides a double pass gain of approximately 1.25. The optical amplifier of this embodiment provides high small signal gain, (1262×), to produce a fluence that reaches saturation for the $Yb^{3+}$ active layer, (approximately 10–27 $kW/cm_2$), and a total average power of approximately 1 kW. The overall dimensions of the optical amplifier are compact, (e.g., 6.8 cm diameter and 20 cm long). The optical path of the optical beam to be amplified is long, (12.8 m), has a small diameter, (3 mm), and is segmented (an approximately 400 micron gain path occurs on each pass through an active reflector and these processes are separated by distances of approximately 40 cm).

As illustrated previously, a problem with many conventional optical amplifiers is the removal of heat from the active reflectors. However, as shown in FIG. 7, the active reflectors of the present invention are not suspended between the construction surfaces, but instead, are located on the construction surfaces. This, in turn, coupled with the use of thin films as active reflectors, allows heat to be removed from the active reflectors in a direction essentially parallel with the direction in which the active reflectors are impinged by the optical beam to be amplified. This method of heat removal reduces thermally induced gradients in the refractive index of the active reflectors. Specifically, because it removes heat in a direction essentially parallel to the direction of the optical beam, the optical amplifier of the present invention does not introduce distortion in the direction perpendicular to the direction of propagation of the optical beam.

With reference to FIG. 11, the advantages of using thin film active reflectors are illustrated. In particular, the active reflector 142 includes both a laser-active layer 144 and a reflective layer 146 that are positioned proximate to a cooling surface 148, which may be the construction surfaces 134 and 136. The reflective layer 146 is preferably a highly reflective coating applied to the cooling surface 148. To obtain thermal coupling between the laser-active layer and the cooling surface, the laser-active and reflective layers are typically positioned on a metal layer 150, preferably made of copper, which is, in turn, contacted to the cooling surface by a contact layer 152 of solder or indium. As illustrated, heat in the active reflector is removed through the back surface of the device in a direction essentially parallel to the direction in which the optical beam impinges the active reflector.

As described above, the active reflector includes a laser-active layer for amplifying the optical beam. The laser-active layer may be formed of any suitable material. For example, many laser-active materials are formed of silica ($SiO_2$), which has been doped with at least one rare earth element. As known to those skilled in the art, the rare earth elements include Lanthanum, Cerium, Praseodymium, Neodymium, Promethium, Samarium, Europium, Gadolinium, Terbium, Dysprosium, Holmium, Erbium, Thulium, Ytterbium and Lutetium. However, optical amplifiers are typically doped with Neodymium, Erbium, Ytterbium or a combination of both Erbium and Ytterbium. In one preferred embodiment, the laser-active material of the active reflector of the present invention is YAG doped with $Yb^{3+}$. YAG doped with $Yb^{3+}$ demonstrates advantageous optical to optical efficiencies (e.g., >60%) and amplified wavefronts having low phase distortion despite optical field intensities that approximate the saturation fluence, 10 $kW/cm^2$, for $Yb^{3+}$ doped materials.

As illustrated in the various embodiments and description, the active, passive, and pump beam reflectors are described as being "located on" on the construction surfaces. It must be understood that this term does not limit the different ways in which the reflectors may be connected to the construction surfaces. Specifically, it must be understood that the construction surfaces may not be physical structures. The construction surfaces may instead only be a description of how the passive, active, and pump beams are situated with respect to one another.

Further, in some embodiments, the construction surfaces may be physical structures, and each of the reflectors are separately manufactured and then applied to the face of the construction surfaces. In other embodiments, the reflectors may be separately manufactured and then incorporated into the surfaces of the construction surfaces. Further, in still other embodiments, the construction surfaces may be manufactured by first applying the reflectors on the surface of a cast and creating a mold. From the mold, the construction surfaces can be formed as unitary sheets having areas that are either active, passive, or pump beam reflectors. This is advantageous for providing rigidity and repeatability of reflector positioning and orientation.

In addition, because the optical amplifier of the present invention uses a plurality of passive reflectors to fold the optical beam into a reduced volume, the individual passive reflectors provide a way to maintain or adjust the optical beam quality. Specifically, the passive reflectors may be used to address beam divergence concerns. Further, the passive reflectors can be used to expand the beam to reduce high intensity in the optical beam. The passive reflectors could also be used to increase the diameter of the beam and thus reduce the intensity (power per unit area) of the beam. The passive reflectors could also be configured such that the active reflectors could be spaced further apart such that the heat from one active reflector does not add to the heating of the another active reflector to thereby reduce the operating temperature of the active reflectors. Additionally, the passive reflectors may be used to control at least one of a temporal distribution, spatial distribution, and phase properties of the incident beam. For example, a paper written by L. J. Gamble, W. M. Diffey, S. T. Cole, R. L. Fork, and D. K. Jones entitled "Simultaneous measurement of group delay and transmission of a one-dimensional photonic crystal" printed at the following web-site: http://www.opticsexpress.org/oearchive/source/14174.htm Vol. 5, No. 11 Optical Society of America, p. 267–72 (Nov. 22, 1999), (the contents of which are incorporated herein by reference), describes at least one system for controlling the optical beam.

In addition to the control systems mentioned in this reference, additional control mechanisms may be realized. For example, surface of the passive reflector could be altered to refocus the optical beam. Further, a passive reflector having a varied level of reflectivity could be implemented and an etalon could be placed in the path of the optical beam to allow for frequency adjustment.

The use of the multiple passive reflectors also provides advantages over an optical amplifier that merely uses a spherical surface to direct the optical beams. Specifically, a spherical surface will typically direct the optical beam through the sequence until it gets to the last reflector that has to redirect the beam. However, a spherical surface will not allow refocusing of the beam and it would tend to be focused down too small on the active medium. The passive reflectors of the present invention, on the other hand, provide a desired optical beam path and provide a desired optical beam diameter. This, in turn, addresses problems with divergence. Specifically, the passive reflectors may be designed such that they may control the optical beam to maintain beam quality.

A further advantage of the optical amplifier and method of the present invention is the ability to regulate the heat generated by the optical amplifier. As stated above, the laser action on the laser-active material of the active reflectors generates heat. If several of these active reflectors are closely grouped together as shown in FIG. 7 above, there may be an unacceptable amount of heat generated within the confines of the optical amplifier. Altering the passive reflectors of the present invention can reduce this heat build up. Specifically, the passive reflectors may be designed such that the active reflectors may be spaced further apart from each other. This, in turn, allows the active reflectors that are generating the heat to be spaced apart such that the heat from one active reflector does not add to the heating of the another active reflector to thereby reduce the operating temperature of the active reflectors.

As set forth above, the present invention provides optical systems and methods that use a plurality of optical reflectors to fold the optical path of an optical beam used in the optical system. Using the folding aspects of the optical reflectors, the optical system and method of the present invention may reduce the operating temperature of the active reflectors. Specifically, the active reflectors of the optical system that generate heat may be spaced farther apart such that the heat from one active reflector does not add to the heating of the another active reflector to thereby reduce the operating temperature of the active reflectors. The passive reflectors used to fold the optical beam may be orientated such that the optical beam is directed to the space apart active reflectors.

As an example a primary goal may be a nearly uniform distribution of heat to be dissipated. Applications in space, e.g., where heat removal is largely by means of radiative cooling and structures are thin so that conduction of heat over substantial distance is undesirable, tend to favor a uniform distribution of the heat load. Because the optical beam propagation through free space carries power from point to point at maximum velocity with minimal heat generation while in transit, a favorable strategy will often be one of distributing the active and passive reflector facets so that the total heat to be dissipated is distributed uniformly.

With reference to FIG. 12, to design an optical system that allows for reduced operating temperatures of the active reflectors, it first is determined the amount heat dissipated at each active reflector facet and at each passive reflector facet, as well as the heat load produced by other elements, such as laser diodes and solar cells, e.g.. (See step 300). The optical beam path is then designed by selecting a particular family of passive and active reflector facets that provide the needed function, e.g., amplification of the optical beam by a specific gain, while otherwise providing an optimally uniform distribution of the heat load. (See step 310). Since the principal heat dissipation occurs at the active reflector facets the nearly uniform spatial distribution of these facets will guide the design of the beam path and the positioning of the active reflector facets. Specifically, the geometry is determined by providing to the developed program the number of active and passive reflectors, the power dissipation per area, and the amount of heat each element is dissipating. (See step 320). The program then determines the geometry for the optical system.

Specifically, in FIG. 13, a pattern 160 is shown that utilizes a combination of active 162 and passive 164 reflectors that provide active disks that have been more widely separated spatially than for an example where the goal was one of minimizing the area or volume occupied by the amplifier. Specifically, if the active reflectors 162 in the center are twice as far apart, it creates more spaces between the passive reflectors. Thus, there is room available for 4 active reflectors in the center instead of 2.

Related patterns could be interleaved so as to generate an overall distribution of a given number of active disks that exhibit an approximately uniform spacing, or a spacing and positioning that, when viewed in terms of the total heat load, results in the most favorable distribution of the heat load and local temperature. For example, FIGS. 14A and 14B, illustrate two sets of active reflectors, 166 and 168, side by side.

It shows how these can be nested to spatially separate the active reflectors, and thus allow easier heat dissipation.

As a specific numerical example, we take the case of a space-based application where the radiation rate is set by a system that is approximately at room temperature. There the heat radiation rate for the two surfaces of an approximately planar array is order of 1 kW per square meter. In this case it is desirable to distribute the heat load so that the heat generated is approximately 1 kW per meter squared at each point in the array. This will favor a large number of active elements spaced more uniformly rather would be sought if the goal was a maximum packing density. Instead of 4 active elements, e.g., 36 active elements on 16.67 cm spacings could be a preferable configuration. Each active reflector sought would dissipate approximately 27 watts. If each active element amplified a 1.0 kW beam this heat load corresponds to approximately 2.7% of the beam power. Each active element would need to provide 27 watts of the total beam power. Consequently a 50% net conversion efficiency would be needed at each active element. These are representative numbers for current technology and could improve in terms of increased total power handled and reduced fraction of the total power that would need to be dissipated as heat. The concept could be applied to these changing input parameters.

As discussed, the concepts outlined above may also be used to design other types of multi-pass optical amplifiers. For example, a laser gyroscope has also been designed and simulated that folds the path of an optical beam. This laser gyroscope is described in a paper written by S. T. Cole, R. L. Fork, D. J. Lamb, and P. J. Reardon entitled "Multi-turn all-reflective optical gyroscope" printed at the following web-site http://www.opticsexpress.org/oearchive/source/23409.htm Vol. 7, No. 8 Optical Society of America pp. 285–91 (Oct. 9, 2000), (the contents of which are incorporated herein by reference). Specifically, the gyroscope is an all-reflective monolithic gyroscopic structure that supports 3 sets of orthogonal, spatially dense and continuous helical optical paths. This gyroscope differs from current fiber optic and ring laser gyroscopes primarily in the free space multi-turn nature of the optical path. The optical beam traverses an approximately helical path. This design offers advantages in the form of a higher spatial density of turns in small structures or greater precision, for a given instrument mass, in large structures. Further, the elimination of optical fiber reduces mass and facilitates the nesting of all three axes plus the signal processing elements in a single volume.

Specifically, with reference to FIG. 15, an embodiment of the multi-pass gyroscope 154 is illustrated. The multi-pass gyroscope includes three families of reflectors, one 156 of which is illustrated in FIG. 15. These families of reflectors are micro off-axis parabolas oriented in the gyroscope so as to guide the optical beam through a series of optimally packed, nearly 90 degree turns. The individual segments of the optical path approximate the modes of a confocal resonator. The three families of beams are formed in a Cartesian coordinate system with one family sensing rotation about the x-axis, one sensing rotation about the y-axis and one sensing rotation about the z-axis. The routing reflector facets for any given family are confined to the two opposing symmetrical confocal sections.

Specifically, the array shown in FIG. 15 includes four quadrants, each of which has 10 rows, each containing 21 facets. One loop of the beam reflects from one reflector facet in each of the four quadrants. The beam is routed to the adjacent facet in the starting row upon the completion of one loop and, in this manner, "walks" along a row of reflector facets parallel to the axis about which it senses motion. When the beam reaches the end of a row, it is routed to the next row, where it proceeds to walk back along the axis in the opposite direction.

Importantly, the complete set of possible paths is formed by utilizing the full area available on a given pair of opposing sections of the sphere for mapping the family of reflectors. As such, similar to the optical amplifier, the placement of these reflectors can be designed using the concepts discussed with regard to FIGS. 4, 5, and 6 to minimize space.

Specifically, with reference to FIG. 16, it is first determined the size of each reflector to be used. (See step 400). Specifically, it is desired to maximize the number of turns within an approximately spherical volume subject to the constraint that the diffraction ripple introduced by any given aperture be less than 1%. This requires each reflector facet diameter $D \equiv 4.6\sqrt{2} \cdot \omega_i(2)$. In this equation, $\omega_i$ is the radius of the beam waist for the $i^{th}$ path segment. The relationship between path length $2Z_i$, beam waist $\omega_i$, and wavelength $\lambda_0$ is $2Z_i = 2\pi\omega_i/\lambda$.

FIG. 15 illustrates the relationship between the minimum uncertainty in measured rate of rotation, the diameter of the including sphere, and the number of reflector facets that can be included in a row. In this configuration, it is determined that the number of facets per row is 21. (See step 410).

Given this information, the radius of the sphere is next determined. (See step 420). Specifically, for a sphere of radius R, the length of a single side of a cube inscribed in that sphere is $a=2R/\sqrt{3}$. The worst case confocal parameter is $2Z_i=2R$. Substituting this into the above equations using a wavelength $\lambda=0.5$ m yields $\omega_0=18.8$ m. Here $\omega_0$ is the upper limit on beam radius. A worst case estimate of the diameter of a sphere that supports this 21-turn-per-row configuration is small, i.e., $2Z_i=2R=2\pi\omega_0^2/\lambda=0.466$ cm.

After determining the radius of the sphere, the geometry of the optical system is then determined so as to provide the desired helical beam path pattern. (See step 430). First, a particular location is chosen as a starting point and then four successive reflections, each at approximately a right angle are chosen. This forms a nearly square loop. The path brings the beam back to the starting location except displaced by 4.6 times the radius of the Gaussian beam at the reflector facet. This pattern is repeated until the beam has walked the available distance, $\sim a=2R/\sqrt{3}$. FIG. 15 illustrates one family of reflector facets and a portion of the beam path produced by the reflector facet array. The array shown in FIG. 15 comprises four quadrants, each of which has 10 rows. Each row contains 21 facets. One loop of the beam reflects from one reflector facet in each of the four quadrants. The beam is routed to the adjacent facet in the starting row upon the completion of one loop and, in this manner, "walks" along a row of reflector facets parallel to the axis about which it senses motion. When the beam reaches the end of a row, it is routed to the next row where it proceeds to walk back along the axis in the opposite direction.

Another important application of the present invention is the use of multiple optical amplifiers to amplify an optical wavefront. Specifically, a much sought after goal is that of amplifying multiple optical beams in a phase coherent manner to kilowatt individual beam power and then combining those beams phase coherently to achieve multi-kilowatt total average power in a single phase coherent wavefront. A core problem is that the multiple goals of achieving amplification to kilowatt and higher average power, maintaining phase coherent wavefronts in multiple physically distinct optical amplifiers, and achieving efficient amplification, are difficult to achieve in combination. A common problem is the random variability of optical phase in any given individual amplifier due to variations in the net optical path through the given amplifier. This optical path will typically vary both due to changes in the physical optical path, as caused by mechanical variation in the distance between two optical elements, e.g., and also due to variations in the index of the media within the optical amplifier, as due to uncontrolled temperature fluctuations. The kilowatt and higher average powers produce levels of heat in a variety of ways that aggravate this random variability. The need for efficiency tends to set an upper limit on the beam size and hence the average power carried by any one individual beam during the amplification process.

With reference to FIG. 17, an implementation of a general design that addresses the above problem is illustrated. FIG. 17 illustrates an array of optical amplifiers 170 that receive a wavefront 172 that has been split into a plurality of beams by a beam splitter 174. A phase comparator 176 is connected to the output of the array and compares the phase of the individual amplified optical beams output by the array 170. One of the optical amplifiers 178 acts as a clock signal to which the other beams may be referenced. Difference in phase are provided via feedback lines 180 to the optical amplifiers to adjust the phase to that of the clock signal. Further, the apparatus includes a beam combiner 182 that combines the amplified optical beams to create an amplified wavefront 184.

This design relies on our method of developing a particular arrangement of active and passive reflector facets in an approximately monolithic, minimal volume, configuration. In general the preferred configuration of reflective facets will not approximate any simple well-known and hence easily fabricated optical surface. A design configuration, however, can be realized by emerging optical fabrication methods based on the use of integrated passive and active reflectors arranged in the approximately monolithic structure described above, (i.e., the use of construction surfaces that have be formed from molds into unitary structures). This provides a degree of relative phase stability of the multiple optical paths over a volume that is large enough to support the multi-kilowatt average optical power and also small enough to maintain optical phase stability over the entire array in a system likely to be of practical interest.

The structure illustrated in FIG. 17, in particular, the principal needs encountered in achieving efficient multiple kilowatt average power amplifiers producing optical fields with high beam quality. The needs are those of: (1) Dividing an incident signal to be amplified into multiple phase coherent beams as by a multi-beam, beam splitter, (2) Maintaining the phase of each optical wavefront propagating through each individual amplifier constant in time, (3) Measuring the departure of the phase of each individual amplified beam from a standard reference such as one of the amplified beams. (One amplified beam can serve, e.g., as a clock signal to which the other beams can be referenced.), (4) Providing a correction to each of the individual optical paths so as to keep the phase of each amplified optical beam stable relative to the phase of the chosen reference beam. (Any variation between a given phase and the phase of the reference optical signal should be small compared to $2\omega$), and (4) Phase coherently recombining the amplified optical beams.

The need to divide the beam into separate beams, amplify each individual beam, and then phase coherently reconstitute the total beam arises from the difficulty, at this time, of amplifying any individual optical beam to much more than a kilowatt. This limitation arises from the finite saturation intensity of the amplifier medium set by the cross section of the amplifying ions, the pump intensity available from the preferred pump sources that we take to be laser diode arrays, and the occurrence of parasitic oscillations in the thin disk amplifier for beam diameters in excess of a few millimeters. These limitations can be circumvented to some degree by various strategies, but, in general, there is an unavoidable need to divide, amplify, and phase coherently reconstitute, the beam as a means of realizing the total average power in the multi-kilowatt and higher range.

The optical amplifier described in detail above with reference to FIGS. 7–10B addresses the above problems in several ways: (1) The compact nature of the amplifier, as opposed to the spatially extended path that would be required without the capability to fold the optical path many times, can provide a more localized and hence more manageable amplification process. This tends to reduce variability of the optical phase delay experienced by the amplified signal due to spatially varying heat load and consequently varying optical paths. (2) The amplifier structure is approximately monolithic. This, and the relatively localized nature, also reduce the variability of the optical path length caused by relative mechanical motion of the constituent parts. (3) Measurements of the optical phase delay can be made and/or corrections to the optical path length can be readily introduced, as at the passive reflector facets at multiple locations within the optical amplifier. (4) The compact nature of the collection of N optical amplifiers facilitates maintaining the overall stability of the system including the sensing and correction elements of the system. The smaller distance reduces the amplitude of mechanically induced variations in optical path, and assists in reducing the time lag between sensing of a phase error and correction of that phase error.

This system of multiple optical amplifiers each having multiple specifically located reflector facets is an example of an extension of our general design algorithm to a yet larger optical amplifier system. The principles of designing a highly specific family of optical paths using the opportunities afforded by multiple specifically positioned and oriented active and passive reflector facets are similar in the individual amplifier and also in the amplifier array. These methods and optical elements facilitate the design goals of sub-optical wavelength stability, overall compact character, efficient amplification, optimum heat dissipation, minimization of unwanted relative mechanical motion, and overall phase stability.

The multiple reflector facets provide multiple opportunities for additional, more sophisticated phase controls, such as photonic structures that can electronically or optically, adjust the lowest, or higher order, optical phase distortion. This opportunity is provided at many points throughout the entire system and provides a means of maintaining the distributed precise control of the optical properties of the entire system to a precision of a small fraction of an optical period.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical amplifier for amplifying an optical beam to a selected power level while minimizing the volume and mass of the optical amplifier comprising:

first and second construction surfaces oriented in facing relationship to each other;

at least one active reflector located on each of said first and second construction surfaces, wherein each of said active reflectors amplifies an optical beam incident on said active reflectors and reflects the amplified incident beam; and at least one passive reflector located on each of said first and second construction surfaces, wherein each of said passive reflectors directs the incident beam to an active reflector located on the opposed construction surface, such that an incident beam is amplified to a selected power level as the incident beam is repeatedly reflected between said first and second construction surfaces, and wherein said passive reflector minimizes the overall volume and mass of the optical amplifier by dividing the path of the incident beam into several smaller paths.

2. An optical amplifier according to claim 1 further comprising at least one pump beam reflector located on each of said first and second construction surfaces, wherein each of said pump beam reflectors directs an optical pump beam such that it is incident on the active reflector located on the opposed construction surface to thereby increase the power level of said active reflector.

3. An optical amplifier according to claim 1 further comprising a plurality of pump beam reflectors located on each of said first and second construction surfaces and positioned to direct an optical pump beam incident to the active reflector located on the opposed construction surface, such that an optical pump beam is systematically reflected between each pump beam reflector and said active reflector thereby increasing the power level of said active reflector.

4. An optical amplifier according to claim 3 further comprising a pump beam reflector located on said first construction surface and positioned such that said pump beam reflector directs the optical pump beam from said first construction surface to pump beam reflectors located on said second construction surface after the optical pump beam has been systematically reflected between all of said pump beam reflectors on said first construction surface and said active reflector on said second construction surface.

5. An optical amplifier according to claim 4 further comprising a recursive pump beam reflector located on said second construction surface and positioned such that after the optical pump beam has been systematically reflected between all of said pump beam reflectors on said second construction surface and said active reflectors on said first construction surface, said recursive pump beam reflector redirects the optical pump beam to said pump beam reflectors such that the optical pump beam is systematically reflected between all of said pump beam reflectors and active reflectors in a reverse propagation path.

6. An optical amplifier according to claim 1, wherein said at least one active reflector is a thin film disk having a plane for receiving the incident optical beam, wherein said active reflector comprises a layer of laser-active material disposed proximate to a reflective layer, and wherein said laser-active layer increases the power level in the incident beam and said reflective layer reflects the incident beam.

7. An optical amplifier according to claim 6, wherein said laser-active layer increases the power level of the incident beam to a first power level when the incident beam is initially received by said active reflector, and wherein said laser-active layer increases the power level of the incident optical beam to a second power level after said reflective layer has reflected the incident beam.

8. An optical amplifier according to claim 7, wherein said laser-active layer is a crystal material doped with ytterbium.

9. An optical amplifier according to claim 6, wherein said at least one active reflector further comprises a heat sink in thermal contact with said reflective layer, wherein said heat sink removes heat from said at least one active reflector in the direction with which the incident optical beam enters the active reflector such that said heat sink minimizes distortions in the incident optical beam due to a thermally induced gradient.

10. An optical amplifier according to claim 1, wherein said first and second construction surfaces are symmetrical confocal surfaces, wherein said optical amplifier comprises two active reflectors located on each of said first and second construction surfaces, wherein the planes defining the active reflectors on which the optical beam impinges is normal to a line drawn between the axes of the said first and second construction surfaces, and wherein said optical amplifier further comprises a first set of passive reflectors located on said first construction surface for directing the incident beam to said active reflectors located on said second construction surface and a second set of passive reflectors located on said second construction surface for directing an incident beam to said active reflectors located on said first construction surface.

11. An optical amplifier according to claim 10, wherein each of said passive reflectors is located on said construction surfaces such that the planes defined by said passive reflectors on which the optical beam impinges is parallel to a line tangent to the symmetrical confocal surface of said construction surfaces.

12. An optical amplifier according to claim 10, wherein said first group of passive reflectors further comprises at least one passive reflector located on said first construction surface and positioned such that said passive reflector directs the incident beam toward said second group of passive reflectors after the incident beam has been reflected between all of said first group of passive reflectors and the corresponding active reflector located on said second construction surface.

13. An optical amplifier according to claim 10, wherein said active reflectors located on each of said construction surfaces are spaced apart about a center of said construction surface and define an axis, and wherein the axis of said active reflectors for said second construction surface are offset 90° with respect to the axis of said active reflectors of said first construction surface to thereby minimize laser action between the active reflectors.

14. An optical amplifier according to claim 1, wherein said at least one passive reflector is controllable to alter at least one of a temporal distribution, spatial distribution, and phase properties of the incident beam.

15. An optical amplifier for amplifying an optical beam to a selected power level while minimizing the volume and mass of the optical amplifier comprising:

first and second construction surfaces oriented in facing relationship to each other;

at least one active reflector located on said second construction surface for amplifying an optical beam incident on said active reflector and reflecting the amplified incident beam;

a first group of pump beam reflectors located on said first construction surface positioned to direct an optical pump beam incident to said at least one active reflector on said second construction surface, such that an optical pump beam is systematically reflected between each pump beam reflector and said active reflector thereby increasing the power level of said active reflector; and a first group of passive reflectors located on said first construction surface, wherein said passive reflectors systematically direct the optical beam between each of said passive reflectors and said at least one active reflector to thereby amplify the incident beam to the selected power level, and wherein said passive reflector minimizes the overall volume and mass of the optical amplifier by dividing the path of the incident beam into several smaller paths.

16. An optical amplifier according to claim 15, wherein at least one of said pump beam reflectors is a recursive pump beam reflector positioned such that after the optical pump beam has been systematically reflected between all of said pump beam reflectors and said active reflector, said recursive pump beam reflector redirects the optical pump beam to said pump beam reflectors such that the optical pump beam is systematically reflected between all of said pump beam reflectors and active reflectors in a reverse propagation path.

17. An optical amplifier according to claim 15 further comprises:

at least one active reflector located on said first construction surface for amplifying an optical beam incident on said active reflector and reflecting the amplified incident beam;

a second group of pump beam reflectors located on said second construction surface positioned to direct an optical pump beam incident to said at least one active reflector located on said first construction surface, such that an optical pump beam is systematically reflected between each pump beam reflector and said active reflector thereby increasing the power level of said active reflector; and a second group of passive reflectors located on said second construction surface, wherein said passive reflectors systematically direct the optical beam between each of said passive reflectors and said at least one active reflector located on said first construction surface to thereby amplify the optical incident beam.

18. An optical amplifier according to claim 17, wherein said first group of passive reflectors includes at least one passive reflector located on said first construction surface and positioned such that said passive reflector directs the incident beam to said second group of passive reflectors after the incident beam has been reflected between all of said first group of passive reflectors and the corresponding active reflector located on said second construction surface, such that the incident beam can be further amplified by said second active reflector.

19. An optical amplifier according to claim 17, wherein said first group of pump beam reflectors includes at least one pump beam reflector located on said first construction surface and positioned such that said pump beam reflector directs the pump beam to said second group of pump beam reflectors after the pump beam has been reflected between all of said first group of pump beam reflectors and said active reflector located on said second construction surface, such that the pump beam can be used to energize said active reflector on said first construction surface.

20. An optical amplifier for amplifying an optical signal to a selected power level while minimizing the volume and mass of the optical amplifier comprising:

first and second construction surfaces in facing relationship to each other, wherein each of said construction surfaces is a symmetrical confocal surface;

first and second sets of active reflectors that collectively amplify the optical signal to the selected power level, wherein said first set of active reflectors is located on said first construction surface and said second set is located on said second construction surface;

first and second sets of pump beam reflectors for providing a pump beam to said active reflectors to energize said active reflectors, wherein said first set of pump beam reflectors is located on said first construction surface and energizes said second set of active reflectors and said second set of pump beam reflectors is located on said second construction surface and energizes said first set of active reflectors; and first and second sets of passive reflectors, wherein said first set of passive reflectors is located on said first construction surface and said second set of passive reflectors is located on said second construction surface, wherein said first and second sets of passive reflectors sequentially redirect the path of an optical beam incident on the optical amplifier between the passive reflectors and the active reflector such that the optical beam is incident on each of said active reflectors thereby increasing the power level of the incident beam to the selected power level, and wherein said passive reflectors minimizes the overall volume and mass of the optical amplifier by dividing the path of the incident beam into several smaller paths.

21. An optical amplifier according to claim 20, wherein said first set of passive reflectors directs the incident beam to said first active reflector located on said second construction surface, and wherein said first set of passive reflectors includes at least one passive reflector positioned such that said passive reflector directs the incident beam to said second group of passive reflectors after the incident beam has been reflected between all of said first group of passive reflectors and first active reflector located on said second construction surface, such that the incident beam can be further amplified by said second active reflector.

22. An optical amplifier according to claim 20, wherein said second set of passive reflectors directs the incident beam to said second active reflector located on said first construction surface, and wherein said second set of passive reflectors includes at least one passive reflector positioned such that said passive reflector directs the incident beam away from the optical amplifier for subsequent use after the incident beam has been reflected between all of said second group of passive reflectors and said second active reflector.

23. An optical amplifier according to claim 20, wherein said first group of pump beam reflectors includes at least one pump beam reflector located on said first construction surface and positioned such that said pump beam reflector directs the pump beam to said second group of pump beam reflectors after the pump beam has been reflected between all of said first group of pump beam reflectors and said second active reflector located on said second construction surface, such that the pump beam can be used to energize said first active reflector on said first construction surface.

24. An optical amplifier according to claim 20, wherein said first and second sets of active reflectors comprises two active reflectors located on said first and second construction surfaces, wherein each of said active reflectors amplifies the incident beam to one-fourth of the selected power level, wherein said first group of passive reflectors comprises two subset of passive reflectors and said second group of passive reflectors comprises two subsets of passive reflectors that systematically direct the incident light beam to both of the active reflectors for said first and second group of active reflectors to thereby increase the power level in the incident beam to the selected power level.

25. An optical amplifier according to claim 24, wherein said first subset of said first group of passive reflectors directs the incident beam to impinge on the two active reflectors of said first group of active reflectors four times per active reflector to increase the power level of the incident beam to one-fourth the selected power level, wherein said first subset of said second group of passive reflectors directs the incident beam to impinge on the two active reflectors of said second group of active reflectors four times per active reflector to increase the power level of the incident beam to half the selected power level, wherein said second subset of said first group of passive reflectors directs the incident beam to impinge on the two active reflectors of said first group of active reflectors four times per active reflector to increase the power level of the incident beam to three-fourths the selected power level, and wherein said second subset of said second group of passive reflectors directs the incident beam to impinge on the two active reflectors of said second group of active reflectors four times per active reflector to increase the power level of the incident beam to the selected power level for a total of 64 passes through said active reflectors.

26. A method for amplifying an optical beam to a selected power level while minimizing the volume and mass of an optical amplifier comprising the steps of:

providing a first and a second construction surface oriented in facing relationship to each other having at least one active reflector located on each of the first and second construction surfaces for amplifying an optical beam incident on the active reflectors and reflecting the amplified incident beam;

sequentially directing the incident beam to the active reflectors located on the construction surfaces, such that the incident beam is amplified to a selected power level as the incident beam is repeatedly reflected between the active reflectors, and wherein said sequentially directing step minimizes the overall volume and mass of the optical amplifier by dividing the path of the incident beam into several smaller paths.

27. A method according to claim 26 further comprising the step of pumping each of the active reflectors with a pump beam to thereby increase the power level of the active reflector.

28. A method according to claim 27, wherein said providing step further comprises providing a plurality of pump beam reflectors located on each of the first and second construction surfaces and positioned to direct an optical pump beam incident to the active reflector located on the opposed construction surface, wherein said pumping step comprises systematically reflecting a pump beam between each pump beam reflector and the active reflector thereby increasing the power level of the active reflector.

29. A method according to claim 28 further comprising the step of redirecting the optical pump beam from the first construction surface to the second construction surface after the optical pump beam has been systematically reflected between all of the pump beam reflectors and active reflector.

30. A method according to claim 29 further comprising after the optical pump beam has been systematically reflected between all of said pump beam reflectors and active reflectors the step of redirecting the optical pump beam to the pump beam reflectors such that the optical pump beam is systematically reflected between all of the pump beam reflectors and active reflectors in a reverse propagation path.

31. A method according to claim 26, wherein said providing step provides at least one active reflector on the construction surfaces that is a thin film disk having a plane for receiving the incident optical beam and a layer of laser-active material connected to a reflector layer such that laser-active layer increases the power level in the incident beam and the reflective layer reflects the incident beam.

32. A method according to claim 31 further comprising the step of removing heat from at least one active reflector in a direction with which the incident optical beam enters the active reflector such to thereby minimize distortions in the incident optical beam due to a thermally induced gradient.

33. A method according to claim 26 further comprising the step of controlling at least one of a temporal distribution, spatial distribution, and phase properties of the incident beam.

34. An optical system that performs a defined function using an optical beam that propagates along an optical path within the optical system, wherein the optical system has at least one of a minimized volume and a reduced operating temperature, wherein said optical system comprises:

a defined volume representing the boundaries of the optical system; and a plurality of optical reflectors positioned within the optical system and in communication with the optical beam, wherein said plurality of optical reflectors systematically fold the optical beam into a structured optical path within said defined volume such that the optical beam performs the defined function of the optical system, and wherein said plurality of optical reflectors by folding the optical beam thereby act to at least one of minimizing the volume of the optical system and reducing operation temperature in the optical system.

35. An optical system according to claim 34, wherein the optical system is an optical amplifier, wherein said plurality of optical reflectors includes both passive reflectors for folding the optical beam and active reflectors for amplifying and folding the optical beam, wherein said optical reflectors are positioned within the optical system such that the optical beam is directed between the passive and active reflectors to amplify the optical beam to a desired power level, and wherein the optical reflectors are positioned such that the volume of the optical amplifier is minimized.

36. An optical system according to claim 34, wherein the optical system is a laser gyroscope having three optical beam paths for sensing rotation in three coordinate directions, wherein said plurality of optical reflectors are positioned within the optical system such that the optical reflectors fold each of the optical beams into helical propagation paths, such that the optical beams propagate within the defined volume of the optical system in a minimized volume.

37. An optical system according to claim 34, wherein said plurality of optical reflectors includes both passive reflectors for folding the optical beam and active reflectors for amplifying and folding the optical beam, wherein said active reflectors produce heat that may alter the characteristics of the optical system, wherein said active reflectors are spaced a desired distance apart to reduce the operating temperature and said passive reflectors are positioned within the optical system such that the optical beam is directed between the passive and active reflectors in a desired optical path to perform the defined function of the optical system.

38. A method for designing an optical system that performs a defined function using an optical beam that propagates along an optical path within the optical system, wherein the optical system has at least one of a minimized volume and a reduced operating temperature, wherein said method comprises the steps of:

defining volume representing the boundaries of the optical system;

providing a plurality of optical reflectors; and positioning the optical reflectors within the optical system, such that the plurality of optical reflectors will systematically fold the optical beam into a structured optical path within the defined volume to thereby perform the defined function of the optical system, and wherein said positioning step by positioning the plurality of optical reflectors to fold the optical beam thereby performs at least one of minimizing the volume of the optical system and reducing operating temperature in the optical system.

39. A method according to claim 38, wherein the optical system is an optical amplifier, wherein said providing step provides a plurality of optical reflectors that includes both passive reflectors for folding the optical beam and active reflectors for amplifying and folding the optical beam, wherein said positioning step positions the optical reflectors within the optical system such that the optical beam is directed between the passive and active reflectors to amplify the optical beam to a desired power level and positions the optical reflectors such that the volume of the optical amplifier is minimized.

40. A method according to claim 38, wherein the optical system is a laser gyroscope having three optical beam paths for sensing rotation in three coordinate directions, wherein said positioning step positions the plurality of optical reflectors within the optical system such that the optical reflectors fold each of the optical beams into helical propagation paths, such that the optical beams propagate within the defined volume of the optical system in a minimized volume.

41. A method according to claim 38, wherein said providing step provides a plurality of optical reflectors that includes both passive reflectors for folding the optical beam and active reflectors for amplifying and folding the optical beam, wherein said active reflectors produce heat that may alter the characteristics of the optical system, and wherein said positioning step positions the active reflectors at a desired spaced apart distance to reduce operating temperature and positions the passive reflectors within the optical system such that the optical beam is directed between the passive and active reflectors in a desired optical path to perform the defined function of the optical system.

42. A method for designing an optical system to perform a desired function using an optical beam that propagates along an optical path within the optical system, wherein the optical system has at least one of a minimized size and a reduced operating temperature characteristic, wherein said method comprises the steps of:

determining the desired optical path of the optical beam as it propagates through the optical system to perform the desired function;

determining the desired characteristic of the optical beam;

determining the desired number of active reflectors needed to create the desired characteristics of the optical beam; and determining the number and position within the optical system of passive reflectors required to systematically fold the optical beam into a structured optical path within a defined volume of the optical system such that the optical beam performs the desired function of the optical system, while also acting to at least one of minimizing the volume of the optical system and reducing operating temperature in the optical system.

43. A method according to claim 42, wherein the optical system is an optical amplifier, wherein said determining the desired characteristics step comprises determining the selected power level at which the optical signal is to be amplified, wherein said determining the number of active reflectors step determines the number of active reflectors needed to amplify the optical beam to the selected power level, wherein said determining the number of passive reflectors comprises determining the number of passive reflectors needed to direct the optical beam at the active reflectors to amplify the optical beam and the number of passive reflectors needed to route the optical beam between passive reflectors, and wherein said determining the number of passive reflectors further comprises positioning the passive reflectors within the optical system to systematically fold the optical beam into a structured optical path within a defined volume of the optical system such that the optical beam is amplified to the selected power level and the passive and active reflectors are positioned such that the volume of the optical amplifier is minimized.

44. A method according to claim 42, wherein the optical system is a laser gyroscope having three optical beam paths for sensing rotation in three coordinate directions, wherein said determining the desired characteristics step comprises determining the desired optical path of each optical beam to create a helical optical path within the optical system, wherein said determining the number of passive reflectors and position step comprises determining the number of passive reflectors needed to direct the optical beam along the helical paths determined in said determining the desired characteristics step, and determining the position of the passive reflectors within the optical system such that the passive reflectors fold each of the optical beams into helical propagation paths, such that the optical beams propagate within the defined volume of the optical system in a minimized volume.

45. A method according to claim 42 further comprising the step of determining the amount of heat produced by the active reflectors that may alter the characteristics of the optical system, and wherein determining the position step comprises positioning the active reflectors at a desired spaced apart distance to reduce operating temperature and positioning the passive reflectors within the optical system such that the optical beam is directed between the passive and active reflectors in a desired optical path to perform the defined function of the optical system.

* * * * *